United States Patent
Henry

(10) Patent No.: US 7,412,042 B2
(45) Date of Patent: Aug. 12, 2008

(54) TECHNIQUE FOR PROVIDING INFORMATION ASSISTANCE INCLUDING A CONCIERGE-TYPE SERVICE

(75) Inventor: Gary E. Henry, Tigard, OR (US)

(73) Assignee: Grape Technology Group, Inc., Bethlehem, PA (US)

(*) Notice: Subject to any disclaimer, the term of this patent is extended or adjusted under 35 U.S.C. 154(b) by 531 days.

(21) Appl. No.: 10/367,090

(22) Filed: Feb. 14, 2003

(65) Prior Publication Data

US 2004/0161097 A1  Aug. 19, 2004

(51) Int. Cl.
H04M 3/42 (2006.01)

(52) U.S. Cl. .................. 379/201.01; 379/203.01; 379/218.01; 379/266.02

(58) Field of Classification Search ........... 379/201.01, 379/203.01, 218.01, 266.02
See application file for complete search history.

(56) References Cited

U.S. PATENT DOCUMENTS

| | | | |
|---|---|---|---|
| 4,551,581 A | 11/1985 | Doughty | |
| 4,582,956 A | 4/1986 | Doughty | |
| 4,959,855 A * | 9/1990 | Daudelin | 379/213.01 |
| 4,979,206 A | 12/1990 | Padden et al. | 379/88.01 |
| 5,163,083 A | 11/1992 | Dowden et al. | 379/88.03 |
| 5,329,578 A | 7/1994 | Brennan et al. | |
| 5,367,561 A | 11/1994 | Adler et al. | 379/91.01 |
| 5,457,738 A | 10/1995 | Sylvan | |
| 5,797,126 A | 8/1998 | Helbling et al. | 705/5 |
| 5,848,131 A | 12/1998 | Shaffer et al. | 379/88.2 |
| 5,850,433 A | 12/1998 | Rondeau | 379/218.01 |
| 5,873,032 A | 2/1999 | Cox et al. | |
| 5,897,620 A | 4/1999 | Walker et al. | 705/5 |
| 5,933,778 A | 8/1999 | Buhrmann et al. | |
| 5,943,417 A | 8/1999 | Cox et al. | 379/266.2 |
| 5,948,040 A * | 9/1999 | DeLorme et al. | 701/201 |
| 5,966,437 A | 10/1999 | Cox et al. | |
| 5,983,200 A | 11/1999 | Slotznick | 705/26 |
| 6,049,796 A | 4/2000 | Siitonen et al. | |
| 6,076,093 A | 6/2000 | Pickering | |
| 6,081,898 A | 6/2000 | Miller et al. | |
| 6,094,640 A | 7/2000 | Goheen | 705/5 |
| 6,125,178 A * | 9/2000 | Walker et al. | 379/211.01 |

(Continued)

FOREIGN PATENT DOCUMENTS

WO  WO 95/17733  6/1995

*Primary Examiner*—Quynh H Nguyen
(74) *Attorney, Agent, or Firm*—Sofer & Haroun, LLP

(57) ABSTRACT

A user may access information assistance for a concierge-type service, whereby the user may make restaurant reservations, purchase goods and services, obtain movie listings, etc. with an agent's (or operator's) assistance. In accordance with the invention, the agent may suggest a vendor for providing the goods or services requested by the user, and attempt to fulfill the user request. The suggested vendor may be one of the preferred vendors pre-selected by the user; it may be one of the preferred vendors pre-selected by a group to which the user belongs; it may be one of the preferred vendors pre-selected by the provider of the concierge-type service; and it may be one of the preferred vendors pre-selected by a telephone carrier to which the user subscribes. The suggested vendor may also be a function of characteristics of the vendors that the user prefers, costs, etc. The invention resolves conflicts of preferences of different parties involved to come up with the suggested vendor.

41 Claims, 13 Drawing Sheets

U.S. PATENT DOCUMENTS

| | | |
|---|---|---|
| 6,134,530 A | 10/2000 | Bunting et al. .................. 705/7 |
| 6,205,436 B1 | 3/2001 | Rosen ......................... 765/65 |
| 6,442,263 B1 | 8/2002 | Beaton et al. |
| 6,459,782 B1 | 10/2002 | Bedrosian et al. ...... 379/201.08 |
| 6,535,596 B1 | 3/2003 | Frey et al. |
| 6,539,080 B1 * | 3/2003 | Bruce et al. .............. 379/88.17 |
| 6,870,921 B1 | 3/2005 | Elsey et al. |
| 7,212,615 B2 * | 5/2007 | Wolmuth .................. 379/88.22 |
| 2001/0049617 A1 | 12/2001 | Berenson et al. |
| 2002/0032589 A1 | 3/2002 | Shah |
| 2002/0055351 A1 | 5/2002 | Elsey et al. |
| 2005/0002508 A1 | 1/2005 | Elsey et al. |

\* cited by examiner

FIG. 4

Name for Reservation [Sharkey, James]  ⊙ Caller,MIN [619 804 1586] ⊙ Caller ID [PB] ⊙

First Choice Restaurant Name ⊙ Phone ⊙ [760 753 13] Address ⊙ [2530 S Coast Highway 101] City ⊙ [Cardiff By The Sea] State ⊙ [CA]
[Beach House Restaurant The]

Second Choice Restaurant Name ⊙ Phone ⊙ [760 634 23] Address ⊙ [1933 San Elijo Av] City ⊙ [Cardiff By The Sea] State ⊙ [CA]
[Viglucci's]

Date of Reservation [Thursday March 4, 1999 ▼] ⊙

Preferred Time [8pm] ⊙ Number in party [2] ⊙ If unavailable then from [7:30pm] to [9:30pm] ⊙

Contact Name [Sharkey, James] ⊙ Method [Phone ▼] ⊙ Number [619 653 9642] ⊙

Contact Name [Walker, Jenny] ⊙ Method [Phone ▼] ⊙ Number [619 896 3276] ⊙

FIG. 5

TeleConcierge Search Form For San Diego

| Dialed | Last Dialed | Status | Restrictions |
|---|---|---|---|

| Next Action Date/Time | Reservation Date/Time | Name | Restaurant | Status |
|---|---|---|---|---|
| 41 03/06/1999 03:00 AM | 03/06/1999 12:00 PM | fran | Beach House Restaurant The | Requires Fulfillment |

Create a new Ticket

If the list above does not contain the reservation request that you are looking for, you can enter additional search parameters and hit the 'Search' button to search all the reservation requests again.

Restaurant

Restaurant name

Search

| Street | City |
|---|---|

FIG. 7

| Dialed | Last Dialed | Status | Restriction |
|---|---|---|---|

| Time stamp | Last Action | Result | Notes |
|---|---|---|---|
| 03/06/1999 02:21 PM | Created | NA | |
| 03/06/1999 03:17 PM | Called Restaurant 1 | Busy | |

Viewed ▼    Successful ▼

Current Ticket Status
Requires Fulfillment
Next Action Date
AUTO
Next Action Time
AUTO Record Event Go back to the Search Screen The ticket status field indicates the current action that needs to be taken for this reservation request. Use the record event button to note the action just carried. The date and time fields are used to determine when the next action should be carried out for this request.

Street                                    City

FIG. 8

| Dialed | Last Dialed | Status | Restriction |
|---|---|---|---|

| Time stamp | Last Action | Result | Notes |
|---|---|---|---|
| 03/06/1999 04:08 PM | Created | NA | |
| 03/06/1999 04:20 PM | Called Restaurant 1 | Successful | Reservation was available for 8:30pm, 1/2 hour later than requested. They will reserve a private booth. Talked to Jim. |
| | Viewed ▼ | Successful ▼ | |

Current Ticket Status
Requires Customer Notification
Next Action Date  AUTO
Next Action Time  AUTO The ticket status field indicates the current action that needs to be taken for this reservation request. Use the record event button to note the action just carried. The date and time fields are used to determine when the next action should be carried out for this request.

| Street | City |
|---|---|

TECHNIQUE FOR PROVIDING INFORMATION ASSISTANCE INCLUDING A CONCIERGE-TYPE SERVICE

FIELD OF THE INVENTION

The invention relates to a communications system and method, and more particularly to a system and method for providing information assistance including a concierge-type service in response to a customer's call.

BACKGROUND OF THE INVENTION

Concierge services are typically provided by hotels. The method generally employed is where a hotel guest, using the hotel room telephone, places a call to the hotel reception and asks to speak to the hotel concierge. The guest is connected to the concierge who then listens to the request of the hotel guest, such as a request for a restaurant reservation, and notes any preferences, such as the guest's preference for outdoor dining. The concierge then suggests a service, an event or restaurant in accordance with the guest's desires and preferences. The suggestion is often based on the concierge's personal knowledge in the field, and/or by consulting a listing book or directory. Should the suggestion be satisfactory, the concierge will make the necessary reservations and inform the hotel guest of the reservation details.

Concierge services are especially useful for a visitor who is unfamiliar with an area's services, eating establishments or upcoming events. The problem with such a service is that it is restricted to the guests at a specific hotel only. The concierge's suggestions, for practical purposes, can also often be biased, erratic or based on limited listing or directory information. In addition to the above, the hotel guest may also need to write down the reservation details, obtain directions and arrange transportation.

Furthermore, the whole process can be slow, as access to large listings are often manually searched by the concierge. The concierge may also be limited by the type of search he/she can perform. He/She may not be able to search for multiple preferences simultaneously, such as for example an outdoor, non-smoking, vegetarian restaurant, in a specific area. In addition, the concierge may only be familiar with restaurants in a particular area and therefore may be of little use to a hotel guest who is departing that day for another city.

Directory Assistance

Traditionally, directory assistance has focused on providing telephone number directory information only. Typically, a directory assistance operator receives a request from a caller for the telephone number of a desired party. The operator locates the required number from a listing directory and may either give the number to the caller or connect the caller to the desired party.

Each year, a growing number of people spend a significant amount of time traveling for business or pleasure. Mobile communication and portable computers have created an opportunity for these people to conduct business and communicate while on the move. Wireless telephones have become a standard business tool in this environment. Wireless telephone users may find current directory assistance services inconvenient or difficult to use. Such users are usually away from their general work environments (for example, traveling in a vehicle), and thus may not be able to remember, or make a note of a desired number. Callers who would normally be able to call upon secretaries or personal assistants at their offices, may not have access to such assistance when traveling. The wireless telephone caller thus needs a comparable service to that which they would experience in an office environment. While improvements to telephone directory assistance have been made over the years, such systems do not fully address the needs of wireless telephone users.

The present assignee has redressed certain of the above-mentioned difficulties by improving the traditional directory assistance service to eliminate the need to make notes of the desired number, or undertake a redialing exercise. Further, it has transformed the traditional directory assistance service to an information assistance service which also provides driving directions, horoscope information, movie listings, sports information, etc. The present assignee has established a country-wide network of information assistance or call centers that are capable of providing its customers with nationwide information assistance.

SUMMARY OF THE INVENTION

The marriage of an information assistance service and a traditional concierge service has been observed. The resulting concierge-type service is described, for example, in copending, commonly assigned U.S. application Ser. No. 09/520,306 ("the '306 application") filed on Mar. 7, 2000. For example, a user may access the concierge-type service to make restaurant reservations, purchase goods and services, obtain movie listings, etc. with an agent's or operator's assistance. However, the '306 application did not address any conflicts in selecting a vendor(s) for providing the goods or services desired by the user, which may arise from preferences of different parties involved, e.g., the user, the provider of the concierge-type service, the carrier to which the user subscribes, etc.

In accordance with the invention, a vendor, suggested by the concierge-type service to provide the desired goods or services, may be one of the preferred vendors pre-selected by the user, which may be specified in a user profile. The suggested vendor may also be one of the preferred vendors pre-selected by a group (e.g., a company, a sports team, etc.) to which the user belongs, which may be specified in a group profile associated with the user. Further, the suggested vendor may be one of the preferred vendors pre-selected by (or affiliated with) the provider of the concierge-type service, which may be specified in a provider profile associated with the user. In addition, the suggested vendor may be one of the preferred vendors pre-selected by (or affiliated with) a carrier to which the user subscribes, which may be specified in a carrier profile associated with the user. As fully described below, the suggested vendor may also be a function of characteristics of the vendors that the user prefers, costs, etc. The invention resolves the aforementioned conflicts of preferences to come up with the suggested vendor.

BRIEF DESCRIPTION OF THE DRAWINGS

These and other features, aspects, and advantages of the present invention will become more readily apparent from the following detailed description, which should be read in conjunction with the accompanying drawings, in which:

FIG. 4 illustrates a first graphical user interface of the present invention;

FIG. 5 illustrates a second graphical user interface of the present invention;

FIG. 7 illustrates a fourth graphical user interface of the present invention;

FIG. 8 illustrates a fifth graphical user interface of the present invention;

DETAILED DESCRIPTION

Figure 1:
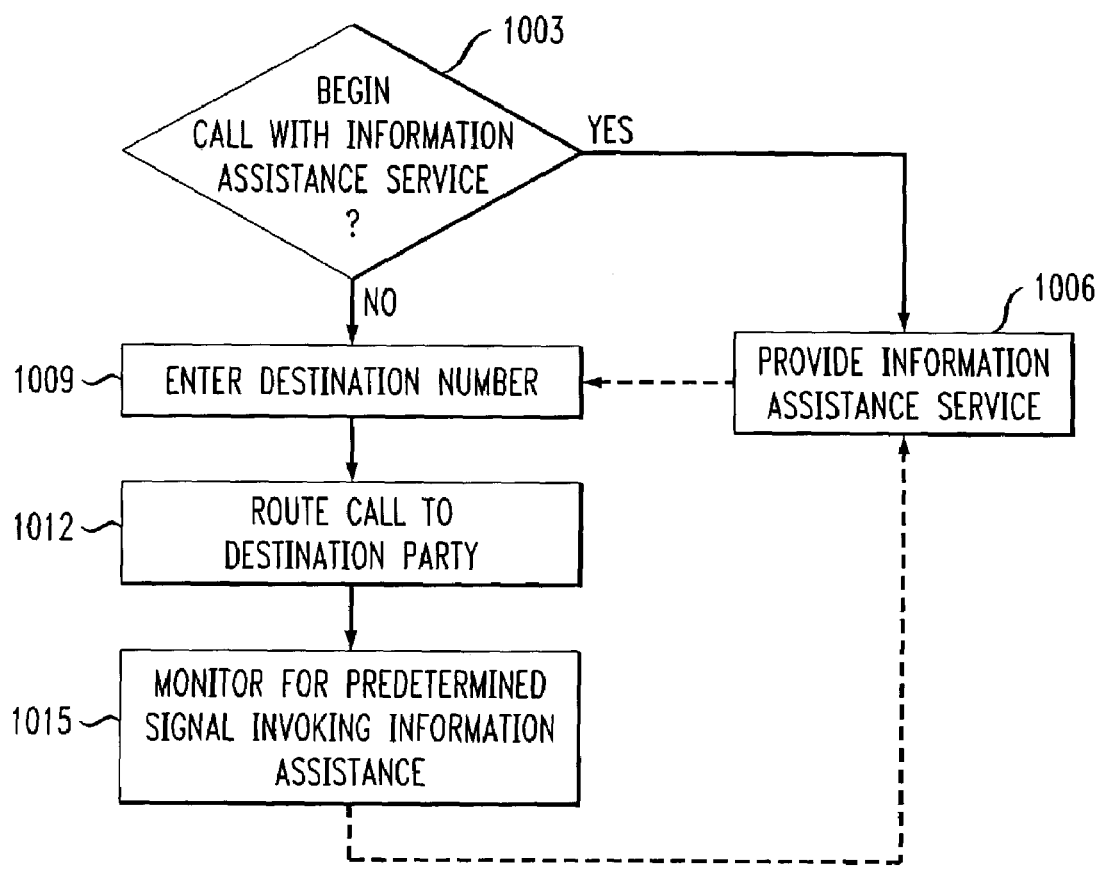
FIG. 1 is a flow chart depicting a routine for accessing an enhanced telecom service in accordance with the invention.

The invention is directed to providing to a user information assistance including a concierge-type service. In prior art, information assistance including, e.g., searching for a desired destination party's telephone number, is considered a special service. Information assistance service charges typically are tagged onto telecommunication charges for utilizing a carrier's network facility to complete the user's call to the destination party. The information assistance service and the telecommunication service typically are priced on different bases. For example, the information assistance service charges typically are determined on a per call basis whereas the telecommunication charges are determined based on the connection time, although the two different charges for an information assistance call may be consolidated in the same bill to the user.

A new "enhanced" telecommunication (telecom) service concept has been developed, which stems from a recognition of the multifarious service features affordable by an information assistance service, which have been developed over time and include, e.g., personalized service features, private directory and calendar service features, and concierge-type service features described below. The enhanced telecom service is born out of an anticipation of a user's or a destination party's taking advantage of the various information assistance service features, even though the user when initially making a call to the destination party may have no intent to use any of the service features. In a preferred embodiment, the provider of the enhanced telecom service has both information assistance capability and network capacity for connecting a user to a destination party. For example, an enhanced telecom service provider may be an improved information assistance service provider having network capacity (e.g., PSTN, wireless, and/or private network capacity) at its disposal, e.g., by leasing capacity and equipment from a carrier. Thus, the enhanced telecom service provider has end-to-end connectivity, readily providing information assistance to a user at his/her initiative during a call. With connectivity costs within its control, the enhanced telecom service provider may charge for the enhanced telecom service according to a single fee schedule, notwithstanding the fact that the user may have utilized both information assistance and telecom services during the same call, for which in prior art are charged according to the respective fee schedules. For example, the provider may charge the enhanced telecom service strictly on a connection time basis, e.g., 9 cents per minute of the call, regardless of the number of invocations of information assistance and connections to different destination parties during the same call. Another time-based arrangement may be a flat fee for an initial block of minutes (e.g. $1.00 for the first 15 minutes) of call time, after which there would be a fixed charge per minute. A flat fee for each call regardless of the call duration may also be practical under the present enhanced telecom service model. A "cafeteria" style plan which may involve separate charges for each service provided may be practical as well.

Advantageously, the enhanced telecom service model is conducive to saving such administrative costs as would otherwise be incurred in prior art where the information assistance and telecommunication service charges are determined separately. Especially where the information assistance service provider and the carrier are independent in prior art, the administrative needs of collecting off-line information concerning assistance service charges due the service provider, associating such charges with the corresponding telecommunication charges due the carrier, and combining both charges for billing a user is advantageously obviated by implementing the present enhanced telecom service model.

However, it will be appreciated that even under the present enhanced telecom service model, a provider may still levy extra charges on a user for specific service features.

The enhanced telecom service may be accessed via a designated telephone number, e.g., 1010-XXX-XXXX, 800-XXX-XXXX number, etc. Such a designated number may be publicized in many ways. For instance, the number may be imprinted on a credit card (especially when services are charged to the credit card), prepaid calling card, telephone charge card, etc. When a user access the enhanced telecom service via the designated telephone number, in accordance with another aspect of the invention, the user is afforded an option to begin the call with an information assistance service, as indicated at step 1003 in FIG. 1. If the user selects such an option, the call is routed at step 1006 to an operator to provide information assistance in a manner described below. (The term "operator" used herein broadly encompasses entities that are capable of providing information assistance in a telecommunication environment, including without limitation human operators, voice response/recognition capabilities, web/WAP-enabled operator services, and other automated and electronic access.) Otherwise, if the aforementioned option is not selected, the user is prompted at step 1009 to enter the destination number which the user wants to call, with the understanding that he/she is able to invoke information assistance any time during the call. In fact, a technique for invoking information assistance and services during a call by a caller or a called party is described, e.g., in copending, commonly assigned application Ser. No. 10/313,712 filed on Dec. 6, 2002, which is incorporated herein by reference. For example, using the disclosed technique, a enhanced telecom service provider may monitor for a predetermined signal such as a DTMF tone initiated by either party's depressing a predetermined key on a telephone. Once one such signal is detected, an operator is conferenced into the call to provide information assistance to the party (ies). At step 1012 the user's call is routed to the destination party through a telecommunication network, wherein a device is used to monitor on the call connection for the predetermined signal invoking information assistance, as indicated at step 1015. Thus, depending on a detection of the predetermined signal, step 1015 may be followed by step 1006 for providing information assistance (indicated by a dashed line connection). It should also be pointed out that step 1006 may be followed by step 1009 (indicated by a dashed line connection) when, for example, the information assistance provided at step 1006 includes searching for a desired destination number, and connecting the user to the desired destination number.

In an alternative embodiment, the user may be provided with two enhanced telecom service access numbers, one of which corresponds to starting the user's call with an information assistance service, and the other corresponds to allowing the user to call the destination number directly, with the ability to invoke information assistance anytime during the call. In addition, different access numbers may be provided for different branding.

A user when making a call through the enhanced telecom service may be identified, e.g., by automatic number identification (ANI), by an entry of a user identification (ID), password, PIN, mother's maiden name, etc., or by voice recognition, voice printing, speaker verfication or other identification techniques. The user may be afforded service features specified in a user profile, e.g., identified by the user ID. The user profile may contain personal preferences which may be selected by the user during an initial registration with the enhanced telecom service provider, and which may be modified subsequently. An implementation of the user profile to render a personalized information assistance service is described, for example, in copending, commonly assigned U.S. application Ser. No. 10/323,287 filed on Dec. 19, 2002, which is incorporated herein by reference.

For example, the user may be an employee of a company, which subscribes to the enhanced telecom service. The user profile may specify the information assistance service features selected by the company, and identify access to the company's corporate directory and other company-specific services. In addition, if the user utilizes the company's facility to make an outside call, the user may be prompted for an entry of a charge number authorized by the company to fully take advantage of the enhanced telecom service.

Billing for the enhanced telecom service may be by credit card, prepaid calling card, debit card, direct billing to subscribers, or billing through a third party which may already have a billing relationship with the subscribers for other services, e.g., utilities.

A user may access information assistance for the aforementioned concierge-type service, whereby the user may make restaurant reservations, purchase goods and services, obtain movie listings, etc. with an agent's (or operator's) assistance. The agent may suggest a vendor for providing the goods or services requested by the user, and attempt to fulfill the user request. In accordance with the invention, the suggested vendor may be one of the preferred vendors pre-selected by the user, which may be specified in the user profile. The suggested vendor may also be one of the preferred vendors pre-selected by a group (e.g., a company, a sports team, etc.) to which the user belongs, which may be specified in a group profile associated with the user. Further, the suggested vendor may be one of the preferred vendors pre-selected by (or affiliated with) the provider of the concierge-type service, which may be specified in a provider profile associated with the user. In addition, the suggested vendor may be one of the preferred vendors pre-selected by (or affiliated with) a telephone carrier to which the user subscribes, which may be specified in a carrier profile associated with the user. As fully described below, the suggested vendor may also be a function of characteristics of the vendors that the user prefers, costs, etc. The invention resolves conflicts of preferences of different parties involved to come up with the suggested vendor.

Figure 2:
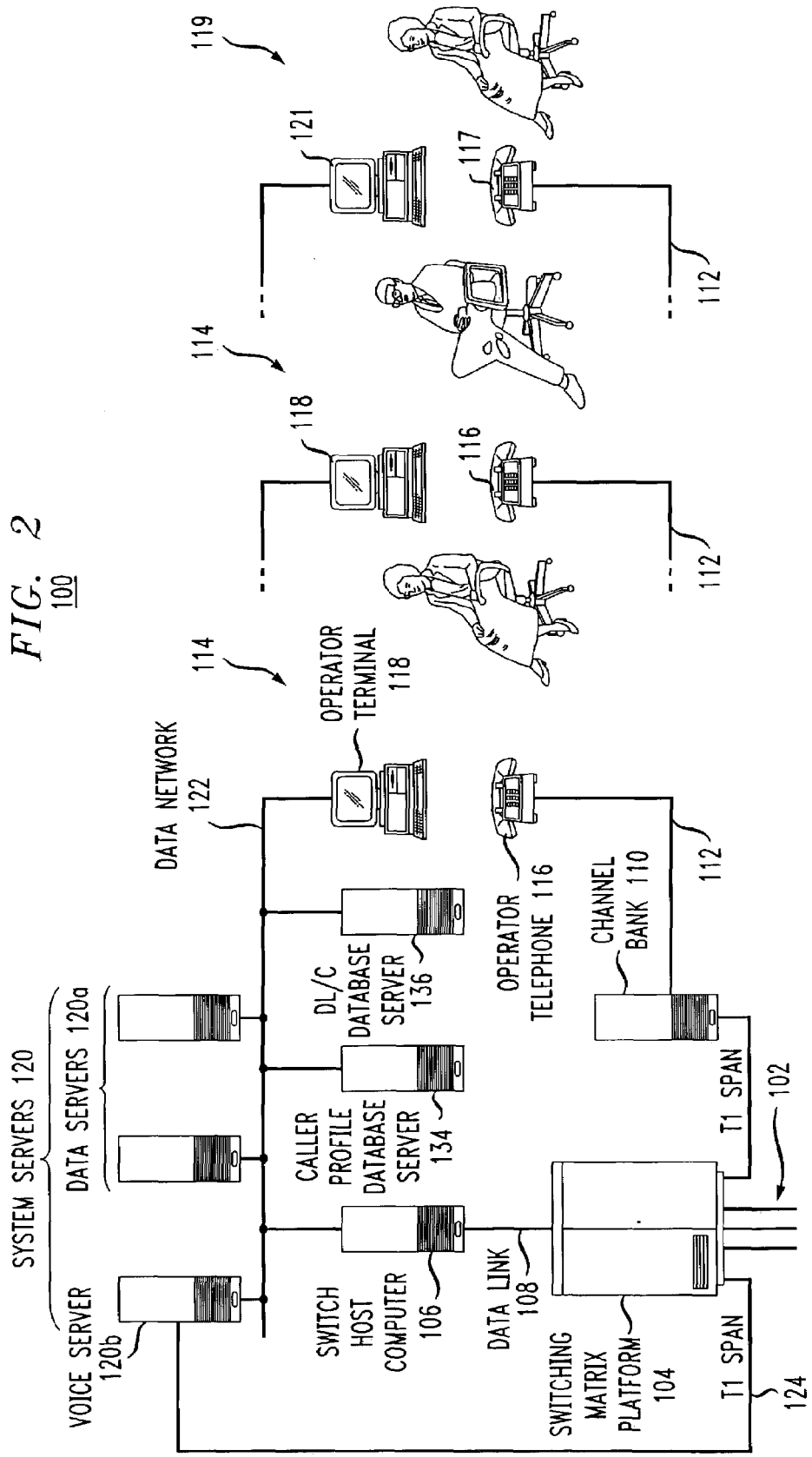
FIG. 2 illustrates the components of an information assistance system according to the invention.

With reference to FIG. 2, information assistance system 100 according to an exemplary embodiment of the invention is depicted. One or more external communication links 102, e.g., T1 communication links, connect information assistance system 100 to a telecommunication network, e.g., PSTN, wireless telephone network, private network, or a combination thereof. Where an information assistance service provider is independent from a carrier as in prior art, information assistance system 100 is administered by the information assistance service provider while the telecommunication network is administered by the carrier. However, where the above-described enhanced telecom service concept is implemented, both system 100 and the telecommunication network are administered by the enhanced telecom service provider. Communication links 102 connect to switching matrix platform 104, which is connected to switch host computer 106 via switch data link 108. In an alternative embodiment, switch host computer 106 is coterminous with switching matrix platform 104.

Switching matrix platform 104 is attached via a T1 communication link to channel bank 110, and from there connects to operator channel 112 and a plurality of operator and fulfilment agent telephones 116 and 117 respectively. Operator telephones are located at each of one or more operator positions (represented by the numeral 114 in FIG. 2), and fulfilment agent telephones are located at each of one or more fulfilment agent positions (represented by the numeral 119 in FIG. 2). Using operator data terminal 118, an operator at operator position 114 accesses one or more system servers 120, which are interconnected via data network 122. Switch host computer 106 is also connected to data network 122. Finally, switching matrix platform 104 is connected to one or more voice servers, which are described below. Each connection to a voice server employs a T1 voice server link (a first voice server link 124 is shown in FIG. 2).

The data network 122 may, but not necessarily, also further connect to a directory listing/concierge (DL/C) database server 136 and a caller profile database server 134. The caller profile database server 134 stores detailed information about a subscriber. Such details may include the subscriber's name, contact details, preferences, dietary requirements, likes and dislikes, past logged activities, etc. The DL/C database server 136 may contain directory listing information on restaurants, events, accommodation, transportation, travel information and booking, stock prices, weather and other services such as grocery or flower delivery, etc.

As stated above, communication links 102 provide telephone connections to information assistance system 100 for incoming information assistance calls and also provide access to the external telecommunication network over which outgoing calls are placed. Communication links 102 may, in an illustrative embodiment, be comprised of one or more T1 communication spans which are known in the art. In such an embodiment, each individual call over a T1 span, whether into or out of switching matrix platform 104, utilizes one of the 24 individual channels into which a T1 span is segmented, each channel providing two-way communications.

It will be recognized by one skilled in the art that multiple instances of switching matrix platform 104 may be incorporated into the telecommunication network or information assistance system 100 without exceeding the scope of this invention.

In this illustrative embodiment, switching matrix platform 104 supports digital T1 telephone circuits and includes digital signal processing circuitry which provides the requisite conference capability (described below), SS7 message generation/detection capabilities, and dual tone multi-frequency (DTMF) and multi-frequency (MF) tone generation/detection capabilities. With respect to the SS7 functionality, the switching matrix platform acts as a signaling node, also known as a service switching point.

Switch host computer 106 stores and executes computer-readable instructions for purposes of, among others, configuring and operating switching matrix platform 104 and directing the transfer of calls through switching matrix platform 104. It also directs the playback of recorded messages to callers connected to information assistance system 100. Prerecorded greeting and closing messages played for callers are recorded in the voice of the operator to whom the caller will be, or was, connected, or in some other voice. Switch host computer 106 directs the playback of the appropriate message by identifying the operator and the inbound channel 102a the caller is connected to and specifying the message to be played.

Further, switch host computer 106 maintains call data for each information assistance call connected to information assistance system 100. The call data stored on the host computer consists of the most recent assistance request received from each caller, and includes one or more of: the calling telephone number, the date and time of the caller's connection to information assistance system 100, the T1 span and channel the caller is connected to, the caller's desired destination telephone number, the status of the caller's previous information assistance request, which operator assisted the caller, etc. Additional call data is stored on system servers 120, as described below. The call data stored on switch host computer 106 and system servers 120 are provided to information assistance providers when a caller makes multiple information assistance requests in one call to information assistance system 100. By considering the collected call data, such as the information that was provided to a caller in a previous request, an information assistance provider can tailor subsequent assistance to be more effective.

Switch host computer 106 also directs the transfer of information between itself and system servers 120 (via data network 122) as well as between system servers 120 and switching matrix platform 104 and operator position 114/fulfilment agent position 119 (via channel bank 110 and operator channel 112).

Operator position 114 includes means by which a live operator receives calls, determines caller's informational needs, searches for and retrieves information from system servers 120, provides information to callers, and initiates outgoing calls. In an exemplary embodiment of the invention, an operator at operator position 114 is provided with a telephone headset 116 for interacting with callers, and data terminal 118, connected to data network 122, for interacting with system servers 120.

Each operator and fulfillment agent is equipped with a terminal 118 and 121 that includes a monitor and keyboard with associated dialing pad. The operator terminals are coupled over a data network 122 to a data server 120a, allowing an operator to access the data in data server 120a through the operator terminals 118 and fulfillment agent terminals 121.

System servers 120, which are interconnected via data network 122, include one or more data servers 120a which provide and manage data services within information assistance system 100. Data servers 120a maintain databases containing telephone and business directories, billing information, and other information in computer-readable form to be searched by operators in response to callers' requests. As introduced above, data servers 120a also store call data for later retrieval by information assistance providers furnishing subsequent assistance to a caller. The call data stored on data servers 120a illustratively include how and where an information assistance provider searched for information to satisfy a customer request, the information retrieved by the assistance provider, how that information was displayed for the assistance provider, and the form in which it was communicated to the caller. Unlike switch host computer 106, data servers 120a save call data concerning all requests made by a caller during one call to information assistance system 100, not just the most recent request, but for a predetermined period of time (illustratively, one hour).

Billing information is stored in the form of call records, which are created for each customer call into information assistance system 100. They contain data such as the caller's telephone number, the date and time of the caller's connection to information assistance system 100, the dates and times of attempted connections to destination parties, the duration of each call leg, etc. A call record is updated each time information assistance is rendered to the associated customer, and is closed when the customer disconnects from information assistance system 100.

The software used to create and manipulate the databases on data servers 120a is known in the art of computer software and allows information assistance providers to search the databases by name, address, type of goods or services, geographical region, etc. In FIG. 2, switch host computer 106 and data servers 120a are depicted as distinct entities; in an alternative embodiment they are coterminous.

System servers 120 also include one or more voice servers (a first voice server 120b is shown in FIG. 2) that provide, in alternative embodiments of the invention, all or a subset of the operator functions provided by a live operator at operator position 114. For example, voice servers store and deliver messages that live operators would otherwise be required to frequently repeat for callers, such as greetings, closing messages, and the caller's requested telephone number.

The voice server 120b, also called a voice response unit (VRU), is incorporated into the system to play the frequently repeated parts of an operator's speech, namely the various greetings and signoffs (or closings), and the caller's desired telephone number where requested. Not only does this system provide a voice-saving and monotony-relief function for the operators, it performs a "branding" function (i.e. the prerecorded messages incorporate the name of the service provider through which the caller was routed to the information assistance service), and it also reduces the amount of time an operator is actually connected to a caller. The voice server may also contain a voice recognition system for receiving verbal input from a party connected to the voice server. Alternatively, the voice server may be part of a system that performs all operator functions in an automated manner.

The DL/C database server 136 and data server 120a provide operators with the means to search for a caller's desired party, and determine the appropriate telephone number. In the preferred embodiment, the databases provide the capability to search not just by name and address, but also by type of goods/services and/or geographical region, or by any other attribute in the caller record, including phone number. For example, the preferred database can answer queries soliciting the names/numbers of Chinese restaurants on a given street. Data indexed in this fashion is usually not commercially available, so the present assignee starts with a commercially available database file (e.g. the Information assistance Database Source available from U.S. West), and enriches it by adding further data manually. The databases may be SQL relational databases. SQL (Structured Query Language) is a standard interactive and programming language for getting information from and updating a database. Queries take the form of a command language that lets you select, insert, update, find out the location of data, and so forth. Database servers 134 and 136 may also be located at a centralized location. Each remote LAN thus accessing these databases via the LAN. Servers 120a and 136 are separated for ease of explanation, but may be incorporated into a single database.

Desirably, the results of the database search presented on the operator's terminal 118 or fulfillment agent's terminal 121 are not alphabetized prior to display, but rather are presented in the order located by the database search engine. (If desired, a deliberate randomization of order could be effected before display.) Businesses at the beginning of the alphabet are thereby not unduly favored by callers using the information assistance service. In the alternative, businesses can bid to be listed at the beginning of the list.

The database software itself may be conventional, preferably a relational database such as is available from Sybase, Oracle, etc., or may be unconventional or proprietary.

Directory listing information may be obtained from a number of commercially available services and/or may be manually entered into the DL/C database server 136.

In an illustrative embodiment, voice server 120b is connected to switching matrix platform 104 by voice server link 124 and to switch host computer 106 and data servers 120a via data network 122. Each voice server connects to switching matrix platform 104 via a separate voice server link.

Voice server link 124 provides voice connections between switching matrix platform 104 and voice server 120b, thus providing means by which callers may be connected to voice server 120b and receive automated operator assistance. Voice server link 124, in an illustrative embodiment of the invention, is comprised of one or more T1 spans, with each one of the 24 channels of each span providing two-way communications.

At appropriate stages in a call progression, the switch host computer 106 initiates a voice path between the voice server and the switching matrix platform 104 such that the caller, or the caller and the operator, are able to hear whatever pre-recorded speech is played on that circuit by the voice server. Computer 106 then instructs the voice server, via the data network, what type of message to play, passing data parameters that enable the voice server to locate the message appropriate to the call state, the service-providing telephone company, and the operator. The recording density used is high enough to provide a good enough quality of message playback that most users of the system should be unaware they are listening to a recording.

Figure 3:
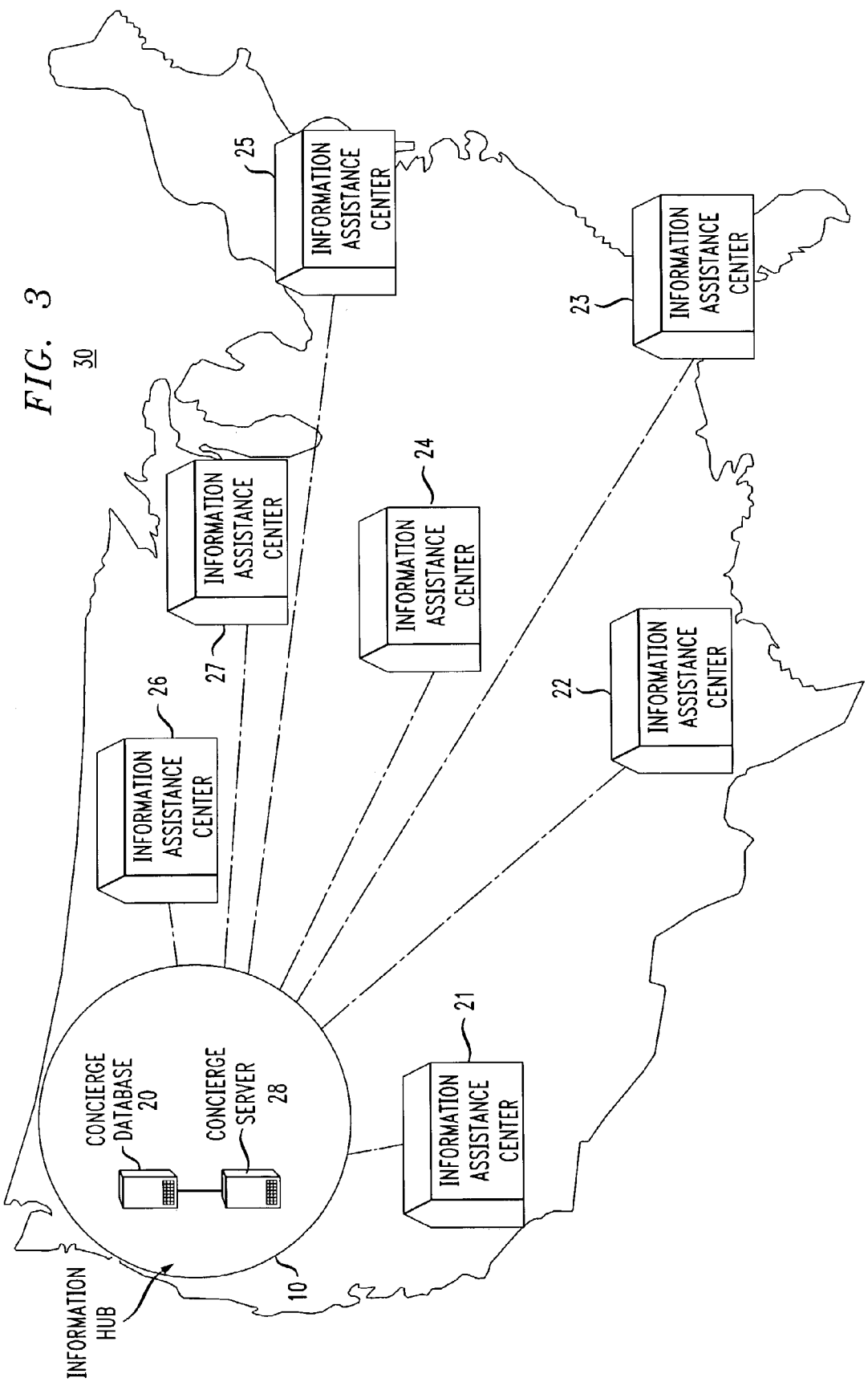
FIG. 3 illustrates an information network system according to a preferred embodiment including a wide area network.

FIG. 3 illustrates an information network system in accordance with the invention, which includes a wide area network (WAN) 30 covering a wide coverage area. The WAN 30 can be an Internet-based network such as the world wide web or can be a private intranet based network. According to a preferred embodiment, the WAN 30 covers an entire region (e.g., the entire eastern seaboard of the United States), an entire country (e.g., United States) or group of countries (e.g., all of Canada, Mexico and the United States). The WAN 30 connects a plurality of operators and fulfillment agents dispersed throughout the wide coverage area in a plurality of information assistance centers 21, 22, 23, 24, 25, 26 and 27. Each of the information assistance centers 21, 22, 23, 24, 25, 26 and 27, which in this instance comprises information assistance system 100 described above, covers one or more regional coverage areas. One or more information hubs 10 are also included in the WAN 30. An information hub 10 contains one or more databases including concierge database 20 and one or more servers including concierge server 28 which are accessible by the operators, and fulfillment agents in system 100.

Invocation of Information Assistance During a Call

In an illustrative embodiment, the user calls the aforementioned designated number to access the enhanced telecom service. The call is routed through a telecommunication network to an information assistance center and terminated at switching matrix platform 104 of system 100 in that center. Referring to FIGS. 1 and 2, once a call is received, host computer 106, in cooperation with voice server 120b, carries out step 1003. If the caller opts to begin the call with information assistance, the call is routed to, or queued for, an operator. Otherwise, host computer 106 causes voice server 120b to prompt the caller to enter a destination number. In response to an entry of the destination number, platform 104 routes the call through an outgoing T1 span 102 to a destination party at the destination number. After the connection is made, either the caller or the destination party may invoke an information assistance service, and the operator would join the call through platform 104 as a conferenced party in a 3-way conference call. Either party could then request the operator to render information assistance, e.g., directory assistance, a concierge-type service described below, etc. Invocation of an information assistance service may be realized by either party's pressing a key (such as "0," "#," or "*") or voicing a command (e.g., uttering "operator") while a digital signal processing device in platform 104 is programmed to monitor the call connection for the resulting DTMF tone or voice command (i.e., a predetermined signal).

It should be noted at this point that after the operator joins the call, the caller may exercise different options by voice commands or by pressing predetermined keys on his/her telephone (DTMF tones), respectively. For example, a first option may be allowing the caller to control the destination party's ability to hear any conversation between the caller and the operator. A second option may be allowing the caller to disconnect the destination party from the call so that the caller can have an exclusive conversation with the operator.

Concierge-Type Service

Operators are generally provided with web browser capabilities, telephone facilities as well as fully-featured operator user interface applications which facilitate the searching and retrieval of information from database sources. According to the present invention, the operators are also capable of receiving requests from calling customers throughout the system of FIG. 2 for requests for concierge-type services. When a request for concierge-type services is received by an operator, the operator completes a record of the request. This record is referred to as a "ticket."

A web-based form of ticket is accessible by each of the operators over the WAN. One such form is shown in FIG. 4. To complete the ticket, information regarding the concierge services request is gathered in a number of ways. The customer may, for example, specifically request a particular restaurant or a particular airplane flight or hotel reservation. Using a request for a restaurant reservation as an example, the operator may solicit from the calling customer their first choice for a restaurant, their second choice for a restaurant, preferred seating times, alternative seating times, etc. In this case, information may be directly entered into the form.

More typically, however, the customer will have certain desires—e.g., a vegetarian outdoor restaurant in "Cardiff by the Sea" as per FIG. 3, or a midnight flight from New York's JFK Airport to San Diego International airport. In this case, the operator will search the various databases at his/her disposal to compile a specific request for the calling customer. The operator may then obtain directly from the calling customer information regarding preferred seating times, alternative seating times, etc.

Information, such as who the calling customer is and contact numbers so that the system can confirm with the calling customer when the request is fulfilled, are advantageously obtained from information regarding the calling customer residing on the system databases. The system automatically uses this database information to complete part of each ticket.

According to the present invention, the operator's web browser provides a direct connection to either a server in one of the information hubs, or to a central server, in the system. In essence, the operator interface and the server are in a client-server arrangement. Thus, in effect, when the ticket is filled-in, the operator sends the ticket over the WAN to the concierge database to be picked up for fulfillment.

Fulfillment agents fill the requests for concierge services received by the operators. Fulfillment agents are provided similar web browser and telephone facilities to those provided to the operators. By means of the web browser, the fulfillment agent has access to one or more web pages. These web pages provide the fulfillment agents with information regarding outstanding requests for concierge services. (The public's access to these web pages is restricted so the privacy of the calling customer is protected.) When a ticket created by an operator needs fulfillment in a particular regional coverage area, the web page for the fulfillment agent servicing that regional coverage area will change and indicate that a ticket needs to be processed. The system periodically refreshes the web pages to keep fulfillment tickets current. Advantageously, the fulfillment agents are located throughout the coverage area. A fulfillment agent preferably is an individual with specialized knowledge of the regional coverage area and the services provided therein so they can effectively fulfill the requests for local concierge services. The fulfillment agent may be a call center supervisor, an underutilized operator or a task specific employee in a particular information assistance center.

According to the preferred embodiment, a centralized concierge relational database is maintained in a central information hub. The preferred database being a structured query language (SQL) relational database, although other relational and non-relational systems may be implemented without departing from the scope or intent of the present invention. A motivation behind maintaining the concierge database in a single information hub is that such centralization provides the capability of receiving a request for concierge services in a first regional coverage area where the requested services are in a second regional coverage area. For example, suppose a business traveler in New York intends to fly later that day to San Diego to have dinner that evening in "Cardiff by the Sea." The traveler dials the New York information assistance center. The traveler informs the operator who receives the call in the New York center of his/her travel plans and his/her desire to eat at a "Cardiff by the Sea" restaurant. The operator in the New York center creates the ticket for the business traveler. That ticket is recorded in the centralized concierge database. The server will then automatically route the ticket to a fulfillment agent in the San Diego information assistance center. As a result, the ticket appears on the screen of the San Diego fulfillment agent in the San Diego information assistance center.

Each information assistance center has an identification number and/or name. When an operator creates a ticket, the system by default assigns the ticket to the information assistance center where it was created. This is accomplished by assigning the originating center's identification number/name to the ticket. However, the operators have the capability to change this assignment, by manually inputting the identification number/name of the center where the request for concierge services is to be directed. In the example above, the operator in the New York center would change the identification number/name of the fulfilling center from the default of the New York center to the San Diego center.

While implementation of full concierge database server in each information assistance center adds administrative overhead, the present invention encompasses embodiments where the concierge database server is not centralized in a single information hub but is instead distributed throughout the system. Similarly, in a further alternative embodiment in addition to the centralized database, one or more localized concierge databases may be maintained locally to keep, maintain and update travel and concierge-type information relevant to only that particular locale. Further, while the concierge database is described and depicted as a separate and independent database from the other maintained databases (e.g., information assistance database or a customer information database), it is well understood by those skilled artisans that the concierge database may reside as part of one or more of the databases maintained by the organization.

Referring to FIG. 3, both the operators and fulfillment agents have access to the concierge database(s). The WAN 30 connects the operators and fulfillment agents to the concierge database(s) 20. In general terms, the concierge database maintains information regarding concierge services. For example, the concierge database includes customer credit card information, and information regarding the status of the request for concierge service. Typically, restaurants and hotel listings are maintained on an information assistance database separate from customer and ticket data. However, in an alternative embodiment, all concierge information is maintained on a separate concierge database.

A further network is provided to connect the fulfillment agents to providers of services, such as airlines, hotel chains, restaurants, travel agents (including web-based travel service providers such as Expedia, Priceline.com, Travelocity). Such a network connection may be a public or private network (such as a VPN).

FIG. 4 illustrates a graphical interface used by an operator to generate a ticket. The interface is designed so that the operator asks appropriate questions to accumulate sufficient information to fill the customer's request. The intent of the interface is that the ticket can be filled by the fulfillment agent without further interaction between the system and the calling customer. However, should further interaction be required, the interface includes contact information so a follow-up phone call can be placed to the customer, either to advise the customer that the request has been filled or to obtain further information so the request may be filled. The interface shown in FIG. 4 is directed to a request for a restaurant reservation. It should be appreciated that different interfaces may be used for different types of requests. For example, an interface may be specifically designed for hotel reservations, airplane reservations or car reservations. The operators may select via menu the appropriate interface for the customer request.

Alternatively, the appropriate menu may be selected automatically by the system based on skills-based routing or by dialed telephone number.

Referring now specifically to the interface shown in FIG. 4, the interface includes a plurality of sets of fields, each of the fields capable of capturing data input. The first set of fields relates to the identification of the calling customer. The first of the three fields in the first set is the "Name of Reservation" indicating the calling customer requesting the reservation. The second field is the "Caller MIN" indicating the calling customer's Mobile Identification Number (MIN). The third field is the "Carrier ID" indicating the carrier who provided the call to the calling center. The system may be designed to input the information into these fields automatically. The calling center's switching equipment described herein is capable of detecting the information associated with these fields directly from the incoming call. Thus, when an operator selects this interface in connection with a call, these fields may automatically be filled in. Additional fields relating to the identification of the calling customer may also be automatically filled in and displayed. The additional fields include the home address of the calling party and the present location of the calling party to the extent such information is available from the carrier, by GPS or other locating means.

The next two sets of fields relate to the particular restaurant desired by the calling customer. The first set of fields relate to the first choice for the restaurant, its phone number, and its address. Similarly, the second set of fields relate to the second choice for the restaurant, its phone number and its address. The fields titled "First Choice Restaurant" and "Second Choice Restaurant" are typically completed with information solicited by the operator from the calling customer. However, records kept in the databases may include a list of favorite restaurants for this particular customer. In addition, there may be more than one list of favorite restaurants maintained, one for each of the different cities frequented by the calling customer. In another embodiment of the present invention, the operator may offer the calling customer recommendations of restaurants from well-known lists of restaurants such as those generated by Zagats, Sidewalk.com or another director database maintained by the system. Advantageously, once the "restaurant names" fields are completed, the remaining fields relating to the phone number and address of the restaurants may automatically be filled in by information obtained from the information assistance databases maintained in the system. Relevant database information can also be manually transferred by the operator into the ticket fields.

The next set of fields in the operator interface relate to the details needed for making the restaurant reservation. The first field is titled "Date of Reservation" which is the date the customer wants the reservation. This field is completed with information solicited by the operator from the calling customer. The date of the telephone call is used as the default and may be modified by operator input to a future date if requested by the caller. The next field is titled "Number in Party" and corresponds to the size of the party for which the reservation is sought. This field is completed with information solicited by the operator from the calling customer. This field advantageously may default to information contained in a record entry in a database corresponding to the calling customer's preferred size of dining party. The third field is titled "Preferred Time" which corresponds to the time the calling customer desires the reservation. This field is completed with information solicited by the operator from the calling customer. This field advantageously may default to information contained in a record entry in a database corresponding to the calling customer's preferred dining hour. The fourth field in this set is titled "If unavailable then from:" which corresponds to the calling customer's acceptable dining times. Again, this field is completed with information solicited by the operator from the calling customer and advantageously defaults to a record entry in a database corresponding to the calling customer's preferred dining hours.

The last set of fields in the operator interface corresponds to contact information. The contact information fields comprise two sets of fields corresponding to a contact name, contact method, and telephone number. Typically, this information advantageously defaults to information contained in a record entry in a database corresponding to the calling customer's preferred contact names, methods and phone numbers. The operator is expected to confirm with the calling customer the correctness of this information. Regarding the contact method, a pulldown menu is provided. Any number of contact methods are available including phone, wireless phone, pager, fax, and email. Whenever one particular method is chosen, the corresponding telephone number and/or email address appears. It is understood that the same name may be entered in both contact name fields but two different contact methods may be chosen, for example, phone and pager.

A notes field not illustrated in FIG. 4, is an additional field in which the operator may type in comments such as special dietary requirements, special seating requests, etc.

It should be noted at this juncture that in accordance with the invention, the information in the ticket is initially used by the operator, who is communicating with the calling customer requesting the concierge-type service, to attempt to fulfil the customer's request in real time in a manner described below. When such an attempt is unsuccessful, the ticket is then forwarded to a fulfilment agent to fulfil the request off-line.

A further field not illustrated in FIG. 4 is the field associated with the center targeted to fill the request off-line. As described previously, the system uses the center which generates the ticket as the default fulfillment center. However, in instances in which the caller seeks concierge services outside the generating center's regional area, the operator will modify the ticket to direct the ticket to the appropriate fulfillment center. In a preferred embodiment, the system, automatically recognizes when the request for concierge services are outside the generating center's regional area and will prompt the operator if he/she wants to direct the ticket to a more appropriate calling center.

Some forms of tickets according to the preferred embodiment are illustrated in FIGS. 5-8. Referring to the form of ticket illustrated in FIG. 5, this ticket is presented by the system to a fulfillment agent sitting in the information assistance call center which will fulfill the ticket, in this example the San Diego call center. Via the WAN, the server in the information hub directs a ticket to the display of a San Diego fulfillment agent. The ticket provides the fulfillment agent with general information regarding a customer's request for concierge services. For example, with the ticket shown in FIG. 5, the fulfillment agent is provided with information regarding the identification of the ticket, the date and time of the next action to fill the request, the desired reservation date and time, the name of the requesting customer, the name of the target restaurant and the status of the request.

A first field is labeled "ID" and corresponds to the identification of the particular request for concierge services. The ticket is linked in the database to other records regarding the concierge services request such as all of the information taken down by the operator in generating the request. The fulfillment agent can access these additional records by selecting the ID field. (Because the ticket is presented to the fulfillment agent in the form of a web page, the fulfillment agent may select the ID field by means of a mouse click. The system server recognizes the mouse click and presents information to the operator.)

It is understood that a fulfillment agent will usually attempt to fill more than one ticket at a time. Thus, a fulfillment agent will necessarily have the capability to step through the various tickets currently at the fulfillment call center that require fulfillment. This advantageously allows the fulfillment agent to prioritize which of the then-pending tickets he/she will attempt to fulfill. Server software may also automatically prioritize tickets, allowing the fulfillment agent to override such prioritization if necessary. The concierge database may be searchable by any and all of the fields in the request, but preferably by the restaurant or customer name. In FIG. 5 it is shown that the agent is provided on his/her screen, facilities to search requests by restaurant name or by reservation name. In addition, the fulfillment agent may step through the tickets pending at that call center, one by one, by page-up and page-down keys, or by back and forward keys on the web browser interface.

The system creates an environment to ensure that tickets are responded to by fulfillment agents in such a way so as to maximize the probability that customers' requests are filled. One of the methods the system implements towards this end is to prioritize, schedule and record all of the actions taken by the fulfillment agents on each request. Thus, the system advantageously minimizes the amount of guess work associated with the request. Instead, it provides each fulfillment agent with clear instructions when attempts to fill a request should be made. The field labeled "Next Action Date/Time" is integral in this process. It informs the fulfillment agent of the time and date that the agent should attempt to fill the customer's request. The system advantageously includes an alarm subsystem which automatically signals the fulfillment agent that an action should be taken toward the fulfillment of the request.

In terms of prioritization, the system employs one or more queues which allow the system to process tickets based on next action time. Depending upon the availability of system resources, the system may assign a plurality of fulfillment agents to each of the queues to maximize the probability of request fulfillment. Each ticket's next action time is preferably based on when an action last took place. A ticket's next action time may be set as follows:
1. No further action required as of midnight of the reservation date.
2. Currently needs further processing.
3. Needs more processing as target telephone was busy.
4. Needs more processing as targeted telephone had no answer.
5. Fulfillment agent may override the next action time.

More urgent tickets may be processed before less urgent ones. The system weighs a number of factors in determining which of the tickets are most urgent. These factors include the proximity between the current time and the reservation date and time and the duration of time that the request has been under the status "Requires Fulfillment." In addition, particular customers may warrant higher or different priority treatment. With these requests, the systems may place these tickets ahead of other tickets in the queue. Alternatively, the system may employ two queues, one for priority customers and one for non-priority customers. Special fulfillment agents, such as those having special language skills or those having more years of experience on the job, may be assigned to the priority queues.

Figure 6:
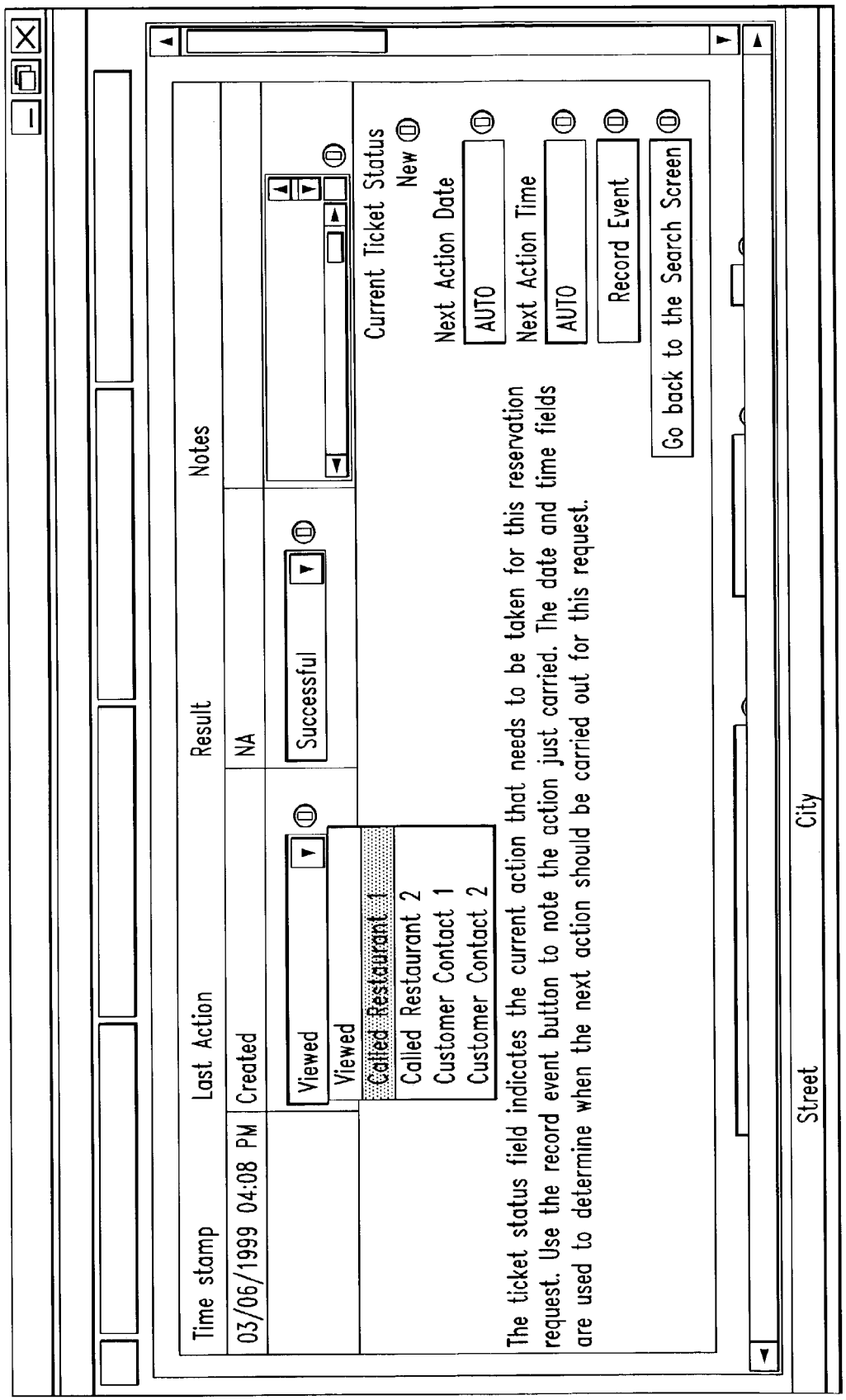
FIG. 6 illustrates a third graphical user interface of the present invention.

Scheduling and recording of the processing of tickets is now described in connection with FIGS. 6-8. FIG. 6 illustrates a ticket after its creation. The ticket comprises a request section and an event section. The request section appears just below the event section and is simply the request as taken down by the operator as described above in connection with FIG. 4. The fulfillment agent may scroll up and down the page to view the different portions of the ticket.

The event section is illustrated in FIGS. 7 and 8. The event sections are essentially a menu-driven table. The event table facilitates the scheduling and recordation of all of the actions taken upon a particular request. A time and date stamp identifies when the last action was taken upon the request. Next, a menu driven list sets forth all of the permissible actions that may be taken with respect to the request. The list of permissible actions include calling the first restaurant, calling the second restaurant, contacting the first customer contact, contacting the second customer contact, or simply viewing the request. Additional action types may be added, as needed. One of the major advantages of the present invention is the ease by which these actions are taken by the fulfillment agent. Upon selection of a particular action, the information assistance center automatically retrieves the number or routing information of the appropriate party (e.g., the telephone number of the first or second restaurants or the pager or email address of the first or second customer contact) from the ticket record and may thereafter attempt to establish a connection with the appropriate party. The information assistance center of the present invention includes one or more voice and/or data connections which provide connection to a public network over which outgoing calls or messages may be placed. Because of this environment, when the fulfillment agent selects a particular action in the menu, a connection to the appropriate party may be established without further action on the part of the fulfillment agent. This eliminates the requirement that the fulfillment agent look up the telephone number in some database (whether it be a phone book or computer database), manually dial the telephone number, redial if a misdial occurs, look up a second number for the second restaurant, and so on. Thus, the present invention significantly reduces the time and effort associated with providing concierge services. The fulfillment agent may also, if desired, manually dial the desired telephone number.

The next column in the event table is a menu driven list of the results of the last action. The list of permissible results of the last action include both the successful completion of an action (e.g., reservation made at desired time, customer contact notified and reservation confirmed, etc.), incomplete attempt to complete action (leaving message on answering machine of restaurant, being placed on waiting list of restaurant, reservation available but outside range of time, unable to contact person, etc.) as well as the failure to complete a request because of the inability of the restaurant to meet the customer request (no reservation within range requested, no tables available, etc.). In addition, any of the possible network communication events such as ring-no-answer, busy, or network problem may be result of last action. These network communication events may advantageously be detected by the information assistance center and automatically entered into the list.

The next column in the events table is a place for the fulfillment agent, if applicable, to write any notes. These notes, along with the remainder of the ticket, allow a second fulfillment agent to pickup where a first fulfilment agent left off and continue processing the first fulfillment agent's ticket.

A ticket has a current status. The ticket may be "new." A "new" ticket indicates there is a first action to be taken for the reservation request. The ticket may "require fulfillment." A ticket "requiring fulfillment" indicates a first action has been taken but further actions are required. The ticket may "require customer notification." A ticket requiring customer notification indicates that the customer must be notified because either the reservation has been successfully completed or there was a failure to complete the reservation and no other actions are possible. The ticket may also be "canceled" or "closed" indicating that the customer has canceled the request or that the request has been completed and the ticket has been closed. A "notified" ticket indicates that the customer has been informed of the status of the request.

The event section of the ticket further includes a next action time/date. Whenever further actions are required on the ticket, the system automatically establishes a time and date for the next further action to be taken. The system uses a simple algorithm to establish the time and date for the next action. So long as there is sufficient time between the current time and the time by which the reservation must be made, the next action time/date will be set at regular intervals (for example, every 15 or 30 minutes). However, when the time between the current time and the time by which the reservations must be made draws near, the next action time/date will accelerate to ensure the customer is notified. This auto next action time may be manually overridden.

In addition to off-line fulfillment of concierge requests by a fulfillment agent (i.e. after the caller has disconnected), concierge requests may be fulfilled in "real time," that is, after the caller has conveyed his/her request to the operator but before the caller hangs up. Of course, this aspect of the invention allows information regarding attempts to fulfill the request, such as confirmation information, to be given to the caller before the caller hangs up.

One way of achieving real time fulfillment of concierge requests is to have the caller wait, either by putting him/her on hold or otherwise, while the operator uses a second, outgoing telephone line to attempt to fulfill the concierge request. For example, if the caller tells the operator he/she wants a reservation at the Tavern on the Green restaurant in Manhattan, the caller could be placed on hold while the operator uses a second telephone line to call Tavern on the Green to make the reservation. The operator would then take the caller off hold and convey to the caller the results of the attempt to make the reservation.

This manner of providing real time concierge request fulfillment has the advantage of being relatively easy to implement, while at the same time offering a number of features and advantages to callers which would not be available to the caller if the caller was simply given the telephone number of an establishment, or connected by the information assistance center to an establishment, and left to fulfill his/her own concierge request. For example, because many users of concierge and information assistance services employ wireless or other mobile devices to request such services, they frequently will not have a pencil and paper handy, making it inconvenient for them to take down the names of all the establishments which can potentially fulfill their concierge requests. In addition, users of mobile devices, particularly when they are in cars, want to dial as few telephone numbers as possible.

The advantages to callers of this aspect of the invention can be illustrated by the example of a caller desiring a reservation at an Italian restaurant having a Zagat Survey food rating of 26-30 on the east side of Manhattan between 40th and 70th streets at 8:30 this evening. The concierge service provider (conveniently termed herein "Concierge Provider," which in some aspects of the invention will also be an information assistance provider including an operator) could provide the caller with the names of all the Italian restaurants that satisfy the caller's geographic and quality requirements, but the caller will likely have no facility for writing this information down. Alternatively, the operator can read the restaurant options to the caller and the caller can be connected to his/her first choice restaurant directly by the Concierge Provider, but if, for example, that establishment does not have a reservation available at the time desired by the caller, the caller will have to redial the Concierge Provider and start the process all over again. Off-line fulfillment of the reservation request might not be satisfactory because, for any number of reasons, the caller may need or want to know what his/her plans for the evening are in short order. Therefore, according to this aspect of the invention, the caller would simply convey his/her request to the Concierge Provider and then hold while the Concierge Provider attempts to fulfill the request.

A caller will, however, sometimes prefer to attempt to fulfill his/her request for a concierge service himself/herself. In this event, the Concierge Provider can provide the return-to-operator feature described in U.S. Pat. No. 5,797,092 to enable callers to be connected to vendors (e.g. restaurants) to fulfill their own concierge requests while at the same time offering them fast and convenient access to additional concierge, information assistance and/or other services with the push of a button (e.g. the "*" key) if, for example, any individual attempt to fulfill a concierge request is unsuccessful (of course, such access can also be provided if the attempt is successful). Further conveniences can be offered, such as storing information regarding the caller's initial concierge request and all subsequent attempts to fulfill it, and making this information available to whichever operator the caller is connected to after invoking the return-to-operator feature. In this way, the caller can return directly to where he/she left off immediately after initiating the return-to-operator capability.

Thus, for example, in the scenario described above in which the caller desires a reservation at an Italian restaurant of a defined quality on the east side of Manhattan between 40th and 70th streets at 8:30 this evening, the caller would be given the names of Italian restaurants which satisfied his/her geographic and quality requirements, and the caller would select one. The Concierge Provider would then connect the caller to the restaurant he/she selected, storing the caller's original request, which restaurants satisfied the caller's geographic and quality requirements, and the caller's selection. If the restaurant the caller selected does not have a reservation available for the caller, or the caller otherwise desires additional service, the caller would initiate the return-to-operator feature (by, for example, pressing the "*" key) and be reconnected to a Concierge Provider operator. A display would appear on the operator's screen of the caller's initial request, all the restaurants which satisfied the caller's geographic and quality requirements, all of the caller's previous selections, results of the caller's attempts to fulfill his/her requests at these establishments, qualifying restaurants which have not yet been tried etc. In this way, when the caller returns to an operator, he/she can immediately be given a choice of all the qualifying restaurants he/she has not yet attempted to make a reservation at. When the caller ultimately disconnects from the call (e.g. goes to an "on-hook" condition), information stored about the concierge request and attempts to fulfill it can either be deleted or stored with the caller's personal profile information (described below) or otherwise for use in serving the caller in the future, report generation etc.

Where real time fulfillment of the concierge request by the operator is desired, although operator use of an outgoing telephone line to fulfill concierge requests in real time is relatively straightforward to implement and provides the features and advantages described above (among others), the preferred manner of providing real time concierge request fulfillment is via electronic communication with vendors or their intermediaries. This is so because such electronic communication facilitates the provision of a number of additional features and a much smoother interface with the caller. For example:

- In some implementations of such electronic communication, the operator can converse with the caller while attempting to fulfill the concierge request, so the caller knows what is being done to fulfill his/her request as it is happening and is not left in an idle state (e.g. on hold) for a protracted period;
- In some implementations of such electronic communication, it is easy to track requested concierge services, fulfillment attempts etc., as such requests are being stored and managed by the Concierge Provider;
- In some implementations of such electronic communication, multiple related concierge services can be easily fulfilled and tracked as a unit, whereby some requests are automatically tracked or fulfilled based on the status of other requests (e.g. car service pickup can be automatically arranged based on scheduled arrival time of a reserved airline flight);
- In some implementations of such electronic communication, operator and caller time is saved by using pertinent previously stored information relating to the caller and his/her preferences to fulfill the request rather than eliciting such information from the caller in real time.

These and other advantages of this aspect of the invention are explained more fully below.

Such electronic communication, in a preferred embodiment, is established between the Concierge Provider and retail on-line reservation systems (ORSs), e.g. World Choice Travel, Expedia.com, OpenTable.com, SavvyDinner, Priceline.com etc. Such electronic communication includes direct operator access to such systems and/or access to such systems via a concierge services server. Electronic communication can also be established between the Concierge Provider and centralized data and reservation systems (CDRSs) and other types of centralized systems (e.g. Pegasus, Sabre etc.) and/or directly with vendor systems, both of which could include direct operator access to such systems and/or access to such systems via a concierge services server. It is understood that any combination of these options is possible and is within the scope of the instant invention.

Whatever the manner(s) of providing real time concierge service, in a preferred embodiment of the invention, the Concierge Provider will offer both real time and off-line concierge fulfillment services. One reason for this is that real time concierge request fulfillment may consume considerable operator time, which may be a substantial cost to the Concierge Provider which is not built into the cost of the call to the Concierge Provider itself. Therefore, for example, if a vendor or its intermediaries will not provide a commission to the Concierge Provider for a referral to the vendor, the Concierge Provider may still provide concierge services with respect to that establishment as a service to its subscribers, but may offer only off-line concierge request fulfillment, either because the cost of such off-line fulfillment is less than the cost of real time fulfillment, or because it will motivate vendors who do not offer commissions to change their policies. Furthermore, it is unlikely that all vendors that Concierge Provider subscribers will wish to patronize will ever all support 24 hour a day/7 days a week real time concierge request fulfillment (e.g. they will not support an automated interface and will not be open 24 hours a day/7 days a week for telephone requests); off-line concierge request fulfillment should be offered in these circumstances as well.

Direct Operator Access to On-line Reservation Systems (ORSs)

There are a number of ORSs with existing interfaces to or relationships with vendors, including World Choice Travel (hotel, airline and car reservations), Expedia.com (hotel, airline and car reservations), Savvydinner.com (restaurant reservations), Opentable.com (restaurant reservations), Moviephone.com (movie tickets) etc., which offer an on-line user interface for requesting reservations. In one aspect of the invention, an operator accesses an ORS with the caller still on the line in an attempt to fulfill the caller's concierge request. The operator waits to receive confirmation from the ORS that the caller's request has been fulfilled, and information regarding the request (e.g. confirmation information, the fact that the request cannot be fulfilled etc.) can be given to the caller on the telephone (in addition or alternatively to giving the caller this information on the telephone, as described below, such information can be sent to the caller by a variety of means).

Such ORSs may be accessed by Concierge Provider operators just as a consumer would access them, over the same interfaces provided to the general public. ORSs may, however, customize features and interfaces for the Concierge Provider. For example:

- although some ORSs require entry of credit card information because, for example, the ORS (or vendor) charges consumers directly for tickets, service fees etc., this requirement could be eliminated for requests made through the Concierge Provider. The ORS (or vendor) would bill the Concierge Provider directly for any applicable costs. The Concierge Provider would in turn bill the subscriber, deduct the applicable costs from an account the Concierge Provider maintains on behalf of the subscriber, or would otherwise be responsible for reconciling the amount owed with the subscriber.
- the ORS could permit the Concierge Provider to identify a subscriber by a subscriber identifier (such as the caller's MIN), rather than require the operator to enter the name, address, phone number etc. of the subscriber via the ORS user interface. The ORS would then use this subscriber identifier to track hotel reservations, car rental reservations and other concierge service requests made by any such subscriber and the status of same. The ORS could also maintain a database of subscriber identifiers and information about the subscribers associated with them (e.g. name, address, phone number, fax number, wireless device number, pager number, Short Message Service device information, e-mail address etc.) which can be used to bill subscribers directly, notify subscribers about concierge request status etc. The subscriber identifier can also be used to report information about the subscriber's concierge requests back to the Concierge Provider, such as information which would permit the Concierge Provider to bill the subscriber for the services used, information which would permit the Concierge Provider to notify subscribers about concierge request status, information from which reports to the subscriber can be generated etc.
- the ORS could provide reports to the Concierge Provider (paper reports and/or on-line accessible reports), such as total activity by service (e.g. number of airline reservations made by the concierge service's subscribers, number of car rentals, amounts spent for each, breakdown of this information by vendor, number of no-shows, discounts offered and received etc.), activity by individual subscriber (e.g. number of airline reservations made, number of car rentals, amounts spent for each, breakdown of this information by vendor, number of no-shows, discounts offered and received etc.), activity as broken down by subscribers of different telephone carriers etc. Such reports can be sent to the Concierge Provider in a predefined format at regular intervals (e.g. monthly), and/or the Concierge Provider can request such reports in any number of ways, such as by sending an identifier of a subscriber to the ORS and receiving (either in real time on the computer display or otherwise, such as batch transmission to the Concierge Provider) the details and status of all (or any identified subset) of the subscriber's concierge requests.

ORSs which provide access to different vendors do not offer the capability of tracking a "complex transaction," such as different interrelated concierge requests. For example, a car service reservation for pickup at an airport could be associated with an airline reservation, both of which could be associated with a hotel reservation, etc. In accordance with one aspect of the instant invention, ORSs would provide support for such complex transactions (either for the Concierge Provider's benefit or otherwise) by linking the reservations together so that, for example, if an airline reservation is changed, the associated car pickup reservation could trigger a notification to the subscriber asking if the car pickup time should be changed (or the car pickup time could be changed automatically based on the scheduled arrival time of the flight). As another example, if a subscriber requests that the operator arrange for a car pickup at Portland airport on June 30th at 3:00, and then requests a hotel room, the system would set sensible default values on the operator's hotel reservation form for the reservation date, time and location.

One way of implementing this capability is by employing reservation codes (or the like) assigned to reservations, allowing the tracking and interrelating of these codes across vendors and reservations. This feature also permits reports to be generated by reservation code (i.e. by the complex transactions) so, for example, the concierge service could quickly ascertain the details and status of all reservations associated with a single complex transaction (in this implementation example, all reservations associated with the same reservation code). As will be appreciated by those of ordinary skill in this art with the benefit of the instant disclosure, other manners of implementing complex transactions are possible, all of which are within the scope of the instant invention.

The Concierge Provider may choose to charge vendors for subscribers referred to them through the ORS. The ORS would keep track of which subscribers were referred to which vendors and the status of these referrals. The ORS may compensate the Concierge Provider itself (possibly a percentage of the fee the ORS receives from the vendor), or it may forward information regarding these referrals directly to the vendors such that the vendors can pay the Concierge Provider the applicable fees. These fees can be based on the referral alone, for referrals that actually patronize the vendors, or on any other agreed upon terms. In addition, the Concierge Provider may itself track these referrals and reconcile them with the records of such referrals maintained by the ORS and/or the payments received for such referrals.

While some ORSs allow consumers to cancel reservations and the like through their service (rather than canceling directly with the vendor), they do not actively track reservation status such that consumers can obtain status information about their request from the ORS interface (e.g., a restaurant is closed on a day the consumer has a reservation due to a snowstorm, or the reserved midsize car is not available but a full size car will be offered at no additional charge, etc.) In accordance with one aspect of the instant invention, ORSs would offer this capability (either for the Concierge Provider's benefit or otherwise) by implementing more sophisticated interfaces to their vendors and/or CDRSs, interfaces which would allow status to be obtained (by the Concierge Provider and/or the subscriber) by using ORS interfaces and/or via messages sent by the ORS to the subscriber (or to the Concierge Provider, which would then notify the subscriber). The manner for implementing such interfaces would be apparent to one of skill in the art having the benefit of the present disclosure.

The ORS user interface could be customized to filter out non-commissionable vendors (i.e. don't give the operator the option to use or refer a subscriber to a vendor which has not agreed to pay referral fees to the Concierge Provider) or to otherwise modify which vendors can be used based on circumstances. The order in which vendors are displayed to the operator can also be customized (e.g. display in order from highest commissions paid to the Concierge Provider to the lowest). Other customizations to the user interface might include currency conversion, European style dates, screens in different languages etc. for Concierge Providers that wish to provide service to subscribers in countries other than the United States.

The ORS could provide a special login to the Concierge Provider to be used for testing and training—a real reservation or other request for service or product would not be created when it is used.

There are a number of ways the Concierge Provider can identify itself to the ORS in order to take advantage of these customized capabilities, such as with a predefined, password protected user name. Other methods or systems by which the Concierge Provider could identify itself to the ORS would be apparent to one of skill in the art having the benefit of the instant disclosure.

While ORSs may customize capabilities especially for the Concierge Provider, this aspect of the instant invention is similar to having the operator access the service on behalf of the caller just as the caller would access the service for himself/herself. Reliance on this model alone has disadvantages. For example, the Concierge Provider is completely reliant on the ORSs for service, features, tracking, reporting etc. Moreover, if a single caller wants a complex transaction from vendors which are not all supported by the same ORS, such as an airline reservation, a rental car and a hotel at the destination and a dinner reservation at a restaurant near the hotel, it is difficult to integrate the requests, made through different ORSs, such that each request is associated with the same order for the same customer and for the same trip. It is also difficult to integrate the concierge services with other services that may be offered by the Concierge Provider, such as, for example, information assistance services, personal profile and calendaring services, etc.

These disadvantages can be overcome, and other advantages achieved, by employing a concierge server for managing the interfaces to the ORSs and the Concierge Provider operators. This concierge server can be used instead of, or in addition to, the direct operator interface to ORSs just described.

Concierge Services Server Interface to On-line Reservation Systems

The concierge server pursuant to one aspect of the invention supports and manages electronic interfaces between the ORSs and the Concierge Provider, and interacts with applications for other services offered by the Concierge Provider to enable integration between the concierge service other services offered by the Concierge Provider (including a partially or wholly consolidated user interface for the operator). The concierge server can support and provide, alone and/or in conjunction with the ORSs, all of the features described above with respect to direct operator access to the ORSs, including the billing, subscriber identifier, reporting, complex transaction, referral fee tracking, reservation status and non-commisionable vendor filtering features.

Concierge Server Interface to ORSs

Figure 9:
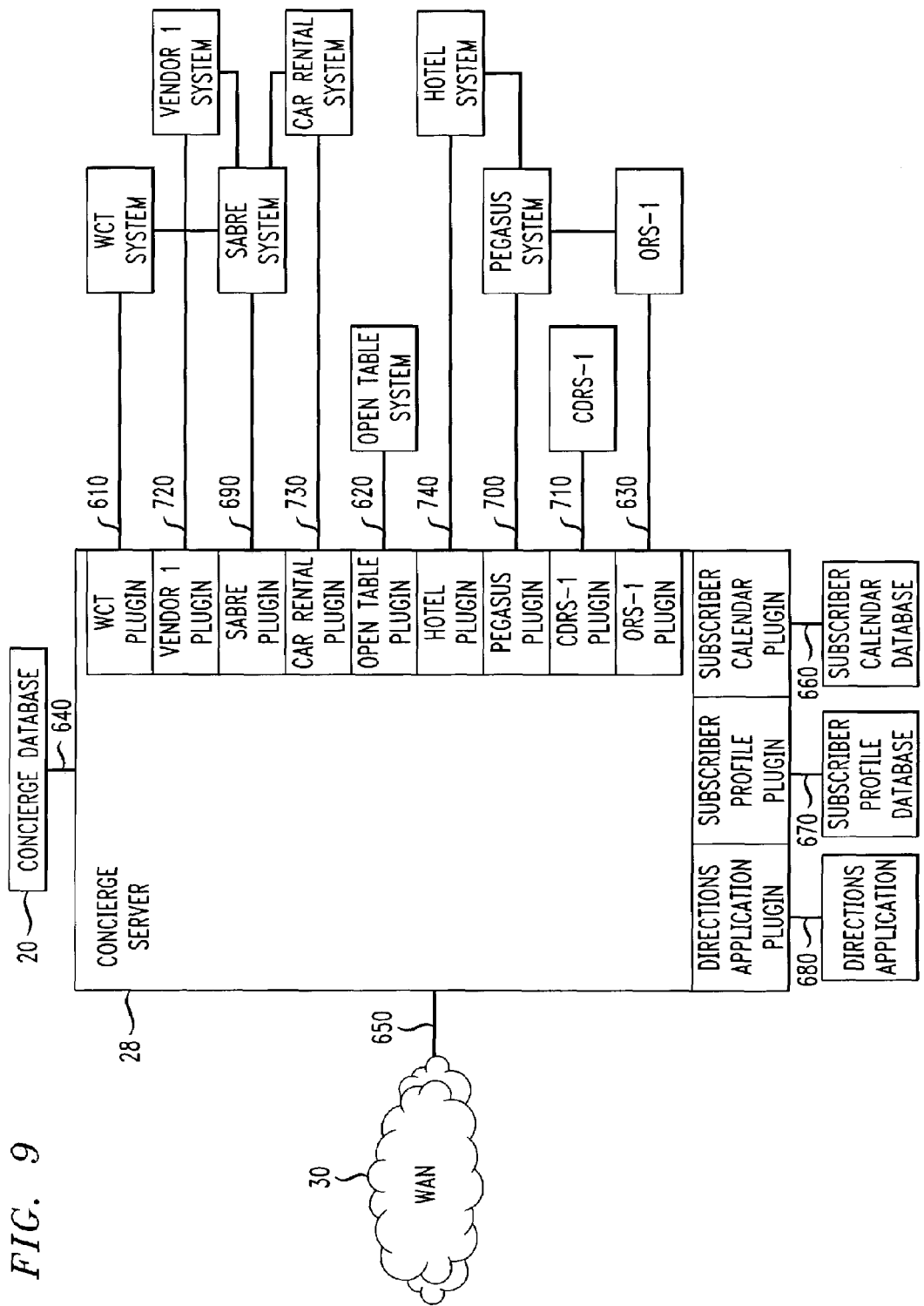
FIG. 9 illustrates an arrangement for providing telephonic concierge assistance in accordance with the invention.

A system architecture in accordance with the invention is shown in FIG. 9. In a preferred embodiment, concierge server 28 is the same concierge server which supports off-line concierge request fulfillment, although it is understood that different servers can be used to support real time and off-line concierge services. Link 610 represents a two way communications path between the concierge server and the World Choice Travel ORS, link 620 represents a two way communications path between the concierge server and the Open Table ORS, and link 630 represents a two way communications path between the concierge server and a generically named ORS-1, which can be any existing or future ORS. Although support of these three ORSs is shown as exemplary, it should be understood that the concierge server can support interfaces to any number of ORSs. In a preferred embodiment, communications with ORSs are carried out over extensible mark-up language (XML) interfaces.

As shown in FIG. 9, communications between the concierge server and the ORSs are facilitated by a series of "plugin modules." Each such plugin module is responsible for supporting the interface between the concierge server and an ORS, including translation between different communication protocols (e.g. the concierge server communicates in XML and the ORS communicates in standard generalized mark-up language (SGML)), data parameter and validation requirements for communicating with the ORS (e.g. what data should be sent to the ORS to initiate a concierge request, how it should be sent, what information the ORS will send to the concierge server, how it will be sent and what it means, etc.), etc. The plugin can also register itself with the concierge server, which can be built to automatically permit registration by plugins, which registration will include information, for example, about the types of capabilities the plugin can accommodate. Programmers of such plugin modules can be provided with an application programming interface (API) by the Concierge Provider which allows such plugin modules to be written without any knowledge of the concierge server implementation or the concierge database schema. This design allows for new ORSs to be supported simply by adding plugin modules to the concierge server—modification of concierge server software itself would not be required to support additional ORSs (or to discontinue support of ORSs).

The concierge server interfaces to the ORSs will substantially eliminate the need for the ORSs to customize user interfaces for the Concierge Provider, since the operators will not, pursuant to this aspect of the present invention, be utilizing the ORSs' user interfaces (the concierge server would provide its own interfaces to the operators). However, the underlying features and capabilities described with respect to direct operator interaction with ORSs (e.g. the billing, subscriber identifier, reporting, complex transaction, referral fee tracking and concierge request status features) would still preferably be supported by the ORSs and/or the concierge server pursuant to this aspect of the present invention. For example, with respect to such real time transactions:

although ORSs would not need to customize interfaces to eliminate the requirement that credit card information be entered, the interface between the concierge server and the ORSs could still be built such that this information was not sent to the ORSs. The ORS (or vendor) could still bill the Concierge Provider directly for any applicable costs, and the Concierge Provider could still in turn bill the subscriber, deduct the applicable costs from an account the Concierge Provider maintains on behalf of the subscriber, or would otherwise be responsible for reconciling the amount owed with the subscriber. Some of the information necessary for billing the subscriber will be available locally to the concierge server, since it controls the concierge request information, but some information, such as whether or not the subscriber actually patronized the vendor (e.g. showed up pursuant to his/her reservation), would still have to come from the vendor (in this embodiment, via an ORS);

the ORS could still permit the Concierge Provider to identify a subscriber by a subscriber identifier (such as the caller's MIN), rather than require the Concierge Provider to send the name, address, phone number etc. of the subscriber via the ORS user interface with the concierge request. The uses of the subscriber identifier described above with respect to direct operator access to ORSs would also apply to the concierge server aspect of this invention;

The ORS could still provide the above-described reports to the Concierge Provider. Again, however, because the concierge server controls the concierge request information, some of the information necessary to generate reports will be available locally to the concierge server;

ORSs could still support complex transactions, and the features and capabilities associated with them, and the concierge server and concierge database will support such complex transactions as well.

The ORS could still keep track of which subscribers were referred to which vendors and the status of these referrals, as would the concierge server, for the reasons described above.

ORSs could still enhance their interfaces to permit active tracking of concierge request status, information which could be sent in batch and/or as requested to the concierge server to allow the Concierge Provider to apprize their subscribers as to such.

The ORS could still provide a special login to the Concierge Provider to be used for testing and training, or to check the accuracy of information received over the XML interface, ascertain information not supplied by the ORS over the XML interface etc.

The ORS will use the communications link to the concierge server to provide the Concierge Provider with regular batch updates of the vendors it supports. For example, if a particular ORS handles hotel reservations, the ORS would provide the Concierge Provider with updates regarding new hotels it supports and/or hotels it no longer supports. The regularity with which these updates are sent by any particular ORS should be a function of the frequency with which that ORS's information changes. This information is stored in the concierge database and, if the Concierge Provider also provides information assistance services, such information (or an appropriate subset of it) is sent from the concierge server to the information assistance application over communications link 650 so the information can be stored in DL/C database server 136. The information regarding each such vendor in the information assistance database could be flagged, using a "flag field," to indicate that this listing represents a vendor that accepts reservations or other concierge requests from the Concierge Provider. Other fields can be used to indicate other information about the types of services the vendor supports (e.g. real time concierge requests, changes or modifications, off-line concierge requests, changes or modifications etc.)

Concierge Server Interface to Concierge Database

Link 640 represents a data link over which data is retrieved from or sent to be stored in the concierge database. This database is used to store reservation information which, in a preferred embodiment, is keyed to the subscribers' MINs. This database can also store references to the databases used by other applications, such as the personal profile and calendaring applications described below. In this way, rather than copy information from those other databases into the concierge database, the concierge database would instead contain references back to the original source of information, thereby allowing the concierge application to have access to the most recent and best data, and substantially eliminating the need to synchronize the data in the different databases.

The concierge database is preferably designed in such a way that fields specific to a particular type of concierge activity can be stored in the database without the need to make changes to the actual tables and columns of the database themselves. For example, if a new field for car rental reservations that tracked the caller's request for an automatic or a stick shift was added to the concierge database, it should not be necessary to add an "IS_STICK_SHIFT" or similar column to a table in the database. One way to do this is to have the concierge server, during the plugin registration process (during which new plugins can describe to the server what fields of information are relevant to the ORS it supports), map the data applicable to the plugin to existing fields in the database, or automatically create new fields in the database for use by the plugin. Whichever way this is done, it is preferable that manual modifications to the database to support new plugins not be required.

For purposes of efficient data management, it is preferred that information regarding concierge requests (the request itself, attempts to fulfill the request, status of the request etc.) be kept in the concierge database until at least (i) the "end date" of the request has passed and the request has been successfully fulfilled; or (ii) the request has been canceled at the subscriber's request, after determining it cannot be fulfilled and notifying the subscriber, or otherwise. Once the request has passed one of these two criteria, it would be flagged as "closed." Concierge requests that are part of a complex transaction, such as a multi-reservation itinerary, should not be considered closed until all the requests which make up the transaction (e.g. all the reservation requests in the multi-reservation itinerary) are closed. The amount of time after a request is closed that the information related to it is retained can be determined based on the type of request (e.g. information regarding requests for hotel reservations are kept for 5 days after the requests are closed, whereas requests for car rental reservations are kept for 3 days after the requests are closed), as a function of who the subscriber is (e.g. the subscriber can indicate in his/her personal profile that information regarding his/her requests are to be kept until the end of the month in which they are closed, after which a summary report is to be sent to him/her, and/or subscribers can pay to have information regarding their requests kept longer than the default time), or otherwise.

In a preferred embodiment, the concierge server supports the ability to replicate the information in the concierge database to a second database (not shown). Any time a record is created or modified, it would be replicated to a second off-line database. This replication of data can be implemented either within the concierge server or by using a database replication tool such as Quest Shareplex. The off-line database could be used for generating reports (without impacting the real time system) and for storing information related to closed concierge requests for longer than they are stored on the on-line database. The period of time information is retained on the off-line database can also be determined based on the type of request, who the subscriber is, or otherwise. The off-line database could also be used to store information used only to generate reports, information such as ORS response times, bandwidth usage etc. which will not be accessed in real time.

Concierge Server Interface to Information Assistance Application

Link 650 provides a two way communications, preferably in XML, between the concierge server and an information assistance application ("DA Application"), such as that which would be employed by a Concierge Provider which also offers information assistance services. The DA Application provides, controls and manages the provision of information assistance services, such as information assistance user interface screens, communications with directory listings databases etc. Interface 650 facilitates the integration of concierge services with information assistance services.

Although, as described above, in some aspects of the invention the concierge server itself can provide user interfaces to operators (the operators of a Concierge Provider which is not also an information assistance provider is not shown in FIG. 8), when the Concierge Provider is also an information assistance provider, the DA Application may provide an integrated interface to both the information assistance and concierge systems. Alternatively, a hybrid system can be used, whereby, for example, the DA Application provides a separate user interface screen or screens with fields for concierge request information, whereby selected fields on the concierge screen can be automatically populated from fields on the information assistance user interface screen. In this latter example, it is the information on the separate concierge screen(s) that are submitted to the concierge server to initiate a concierge request.

In one scenario, when an information assistance request is received by an information assistance operator, the operator will search the information assistance database for information responsive to the caller's information assistance request. For example, a customer may ask for the telephone number of The Beach House Restaurant in Cardiff By The Sea, California, and the operator will do a search for that number. If an indication had been previously received from an ORS that it can support real time reservations at The Beach House Restaurant, the DA Application will recognize this fact (e.g. from the flag field stored in the database) and display information to the operator that this vendor accepts real time concierge requests from the Concierge Provider (such as by highlighting the entries for this vendor on the operator's screen and/or providing a textual notification such as "this hotel takes reservations".) The operator could then offer to make the reservation at The Beach House Restaurant for the caller while the caller waits.

As an alternative to selecting a hotel, car rental agency, restaurant or other vendor by selecting from a list of all vendors satisfying the caller's requirements (whether or not they accept real time reservations), the operator can also, by typing appropriate keywords or otherwise, directly initiate a search for vendors at which the Concierge Provider can make real time reservations for the caller. For example, the operator could enter "City=Portland, Name=Hilton" and a designated key or keys (such as "CTRL R" for listings of vendors which take Reservations) to initiate the search, and all matching Hilton hotels in Portland that support real time reservations from the Concierge Provider would be displayed.

As described, in a preferred embodiment, the information assistance operator would resolve which establishment the subscriber was interested in, and would then initiate a concierge request with respect to that establishment. However, it can be possible for the operator to simply forward a broad concierge request to the concierge server, such as a request by a subscriber to "make me a reservation for tonight at a Hilton in Portland, Oreg." The concierge server would then attempt to fulfill the request, and report the results of the attempt back to the DA Application, including, if applicable, the name, address etc. of the Hilton in Portland at which the reservation was made.

It is possible that there will be some delay between the time the operator initiates the concierge request and the time either a confirmation or an indication that the request could not be fulfilled is received by the operator. Therefore, the concierge server should immediately return an interim message (and possibly subsequent interim messages) to the DA Application for display to the operator, such as "please wait" or "still processing," so that the operator knows the concierge request has been received and is being processed.

However the request for concierge services is initiated, the request must be sent from the DA Application to the concierge server over communications link 650. The DA Application will send the concierge server information about the concierge request, the ORS which services the vendor at which the concierge service is requested (the ORS which included this vendor in the batch updates stored in the information assistance database), and any vendor identifier supplied by the ORS for that vendor. This information will assist in ensuring that there is a match between the information assistance listing for the vendor and the ORS listing for the vendor, even though the listing name may not be exactly the same for both.

Preferably, the batch information received from the ORSs will include which vendors support real time concierge request fulfillment and which support off-line concierge request fulfilment, and for each vendor, which types of concierge requests can be canceled or modified in real time and which types the ORS must confirm with the vendor sometime later (for example, using the World Choice Travel ORS, it is presently possible to cancel a car rental reservation, but confirmation of this won't be received for up to 48 hours.) The operator would then have this information available to him/her at the time he/she takes the concierge request from the caller, and would know before he/she initiates a request (or a request for a change or cancellation of such a previously made request) that the vendor in question supports the type of request in question. The concierge server would also know a priori which ORSs can support which requests, and will therefore not have to determine this in real time. If an ORS does not provide this information to the concierge server in batch form, the concierge server can determine the ORS's capabilities in real time, either by specifically communicating with the ORS to determine its capabilities or by simply submitting the request to the ORS and receiving notification back from the ORS that the request cannot be fulfilled if the ORS does not support the type of request in question.

If a subscriber desires a real time transaction, and a real time transaction is not supported by any qualifying vendor which can fulfill the request, the caller can be offered the option of having the request fulfilled by the Concierge Provider off-line. Whether the request is a concierge request, a change request or a cancellation request, the concierge server should support the ability to regularly "poll" the ORS to determine the status of the concierge request or if the change/cancellation has been processed. Once the concierge server receives a confirmation from the ORS that the concierge, change or cancellation request has gone through, or any other status information from the ORS, the concierge server can initiate delivery of this information to the subscriber, possibly by the means described in the subscriber's personal profile.

Change and cancellation request can give rise to concierge request discrepancies. For example, the subscriber may have made a car rental reservation (and had this confirmed), and then some time later, call back and request that the date of the pickup be changed from June 30th to June 29th. However, the ORS may not support a real time change of this type of reservation, but instead may only allow the change request to be submitted and a confirmation of the change returned back some hours (or even days) later. In this type of scenario, the concierge server must be capable of keeping track of these changes to the reservation in its local database, even though this change hasn't yet been confirmed by the ORS. This will allow the Concierge Provider to retrieve the correct (from the subscriber's perspective) reservation details, put the reservation date in the correct location on the subscriber's personal calendar (as described below), etc. Of course, if the ORS does not support electronic changes to concierge requests, these change requests must be flagged for "manual fulfillment," whereby an operator or fulfillment agent (which may be the same person) can take the appropriate steps to accommodate the subscriber's request (e.g. call the car rental agency directly).

When the concierge server has received a confirmation from an ORS that the requested concierge request has been fulfilled, it will send this information, along with any appropriate confirmation information (e.g. confirmation number, name of the vendor at which a reservation was made and the time, etc.), over communications link 650 to the DA Application, which will display this information to the operator. The confirmation information would then be given to the caller over the phone and/or provided to whichever persons, by whatever means, the caller specifies, either in real time or as defined in the caller's personal profile.

Alternatively, the concierge server may determine that the concierge request cannot be fulfilled. In this event, an appropriate message would be sent from the concierge server to the DA Application, which would then display a message for the operator on the operator screen. This information, too, would then be given to the caller over the phone and/or provided to whichever persons, by whatever means, the caller specifies, either in real time or as defined in the callers' personal profile information.

Concierge Server Interface to Other Concierge Provider Applications

As shown in FIG. 9, the concierge server can also interface with applications for other services that may be offered by the Concierge Provider in order to integrate these services with the concierge services. Of course, these services can also be integrated with information assistance services, and the information assistance operator can offer information assistance, concierge services and other services all in an integrated fashion.

Link 660 represents a two way communications path, preferably an XML interface, between the concierge server and a subscriber calendar application which maintains subscribers' calendars, and link 670 represents a two way communications path, also preferably an XML interface, between the concierge server and a subscriber's personal profile information. Like the interfaces to the ORSs, the interfaces to applications are also preferably made through plugins, so that the concierge server can support new applications (and support can be discontinued for applications) without requiring modifications to the concierge server itself. The calendaring and personal profile features, which are described in copending, commonly assigned application Ser. No. 09/865,230, filed on May 25, 2001, hereby incorporated by reference, can be integrated with the concierge capabilities such that, for example, the caller can indicate preferences and other information which will be stored by the Concierge Provider and used to facilitate the taking and fulfilling of concierge requests. This could include (but is not limited to) information relating to:

Subscriber General Information

Subscriber credit card information (names, numbers, expiration dates etc. for each card and a default card to be used if more than one card is defined), subscriber contact information (e.g. address, phone number, fax number, wireless device number, pager number, Short Message Service device information, e-mail address etc.), contact information for friends, relatives, acquaintances and others (e.g. name, spouse's name, address, phone number, fax number, wireless device number, pager number, Short Message Service device information, e-mail address etc.), whether reservation information should automatically be added to the subscriber's calendar (see description of calendar capability below), etc.

Restaurants

Information contained in the caller's profile could include, for example, preferred types of food (e.g. Italian, Chinese), preferred restaurants, preferred restaurants for each different type of food (e.g., Giambellis for Italian food, Shun Lee Palace for Chinese food etc.), preferred restaurants by city, preferred seating (e.g. smoking or non-smoking), review requirements (e.g. the caller may be interested only in restaurants with a food rating over "20" in the Zaggat guide), preferred seating time, accepted credit card requirements, preferred number in party, preferred seating time, preferred price range, child seat requirements etc.

In this way, a caller can access the Concierge Provider from anywhere in the country, and by indicating only, for example, that he/she wants a dinner reservation, have the Concierge Provider make recommendations and reservations, either in real time or after the caller hangs up.

Movie Theaters

Information contained in the caller's profile would include, for example, preferred movie theaters, preferred types of movies (e.g. comedies, romance, action drama, musical etc), favorite actors and other information which would allow the Concierge Provider not only to make reservations but to suggest movies the caller might like to see. Similar criteria would apply to live theater preferences.

Car Rental

Information contained in the caller's profile would include, for example, preferred car rental agencies (e.g. Hertz, Avis, Budget etc.), preferred car type (e.g. compact, mid-size, SUV, pick-up, transmission type etc.), preferred options (GPS system, unlimited mileage, insurance requirements, gas purchase options), frequent flier number (or other similar number whereby the customer gets miles, rebates etc. for frequent travel or use), ability to pick up and drop off at different locations, preferred price range, child seat requirements etc.

Airlines

Information contained in the caller's profile would include, for example, preferred airlines, preferred seating (window or isle), frequent flier number (or other similar number whereby the customer gets miles, rebates etc. for frequent travel or use) etc.

Hotels

Information contained in the caller's profile would include, for example, preferred hotels (e.g. Hilton, Holiday Inn etc), preferred room type, smoking or non-smoking preference, preferred floors (e.g. high floors preferred), preferred bed type (e.g. king, queen, twin etc.), preferred number of beds, amenity requirements (pool, health club, 24 hour room service, child services, bar, restaurant, room service, business center, golf, tennis, free parking, valet parking, free newspaper, handicap accommodations, laundry services, pet friendly, skiing, shoe shine etc.), preferred price range, credit cards accepted, child seat and crib requirements etc.

It will be apparent to those skilled in the art having the benefit of the instant disclosure that this aspect of the present invention applies equally to many other reservation and ticket oriented domains (e.g. sporting events, trains etc.), and the scope of this invention is intended to be broad enough to cover each of these domains. Moreover, it will also be immediately apparent which preferences make sense for each type of domain (e.g. preferred carrier would apply to trains, frequent flier numbers would apply to hotels etc.).

With this information having been previously stored by the system, the operator does not have to elicit the information from the subscriber as the subscriber's concierge request is being taken, thereby saving both operator and subscriber time. Because the system can identify the caller from the caller's MIN, before the caller actually begins to speak to the Concierge Provider operator, the operator will already know who the caller is, and will have access to all the stored information about the caller. The subscriber can even identify in his/her personal profile information what types of calls he/she will generally make, and what type of information about him/her he/she would like on the operator's screen before he/she and the operator even begin to speak. If the caller does not subscribe to the Concierge Provider's personal profile or calendaring services, the caller will have to repeat his/her preference information, availability and the like on every call. This gives the operator the opportunity to cross sell other services on such calls by saying, for example, "would you like us to store this information for you so I don't have to ask you these questions on future calls."

Of course, a caller should have the option on any call to override his/her personal preferences, to add to them and/or to describe preferences which apply to the instant call only. For example, although the caller may identify in his/her personal profile that he/she is to be contacted by e-mail if a reservation is confirmed (e-mail which can include, for example, name, number, address, driving directions etc. of the establishment at which the reservation is made) or by phone if it cannot be fulfilled, he/she can change these requirements on any specific call with respect to any specific concierge request. As another example, although the subscriber may have identified in his/her personal profile that confirmation about dinner reservations be provided to all attendees, the subscriber may not have stored information about some of the attendees in his/her personal profile. This information too would have to be provided by the caller during the call.

As explained above, the subscriber can identify that driving directions be sent to himself/herself and/or others, and the manner in which those directions are to be sent. Moreover, because this invention provides for real-time reservation confirmation, it is possible, for example, that a caller will be in a car at the time the reservation is confirmed and will want to travel immediately to the establishment at which the reservation was made. Therefore, in a preferred embodiment of the invention, the concierge server also provides via link 680 a driving directions application, such as that described in copending commonly-assigned application Ser. No. 09/826,122, filed on Apr. 4, 2001, which is incorporated herein by reference. The driving directions may be communicated in XML.

Because the Concierge Provider will also keep the subscriber's calendar, and the concierge server will have access to this calendaring information over link 660, the Concierge Provider can act as the subscriber's personal assistant. Not only can the operator take and fulfill concierge requests for the caller, the operator can tell the caller when he/she is available, when other subscribers to the calendaring service are available (if those subscribers permit such disclosure either in general or to the requesting subscriber in particular) and, when concierge requests are fulfilled, the subscriber's calendar can be automatically updated. Subscribers to the calendar service can indicate in their personal profile who can have access to their calendar information. Calendar information can also be sent to the subscriber via electronic means so that, for example, it can be synchronized with the subscriber's other electronic calendars (Microsoft Outlook, Palm Pilot, etc.)

While the discussion thus far has been described in the context of subscribers issuing concierge requests over the telephone to the Concierge Provider, it is also possible, of course, for concierge requests and other services to be requested by the subscriber by other means. For example, subscribers can be given e-mail addresses to which to submit their concierge or other requests for service, and these e-mail requests can be serviced by either operators dedicated to servicing such requests or by the same operators that service telephone-initiated requests. As another example, the Concierge Provider may provide a web-based interface by which subscribers can log on and make their concierge service requests.

Concierge Provider Interfaces to CDRSs

As shown in FIG. 9, some ORSs, such as World Choice Travel (WCT), do not interface directly to vendors, but rather interface to CDRSs, which are centralized management systems supporting one or more vendors. For example, the Sabre CDRS manages reservation and scheduling information for a number of airlines, airlines which themselves use Sabre as their own data management system. CDRSs generally provide interfaces to ORSs and others for a fee.

CDRSs can be thought of as a special kind of ORS and, as shown by links 690, 700 and 710, the concierge server can interface with CDRSs in addition to or instead of interfacing to ORSs. Link 690 represents a two way communications interface with the Sabre CDRS, link 700 represents a two way communications interface with the Pegasus CDRS, and link 710 represents a two way communications path between the concierge server and a generically named CDRS-1, which can be any existing or future CDRS. Although support of these three CDRSs is shown as exemplary, it should be understood that the concierge server can support interfaces to any number of CDRSs. In a preferred embodiment, communications with CDRSs are carried out in XML.

As will be appreciated by one ordinary skill in the art having the benefit of the present disclosure, the nature of these interfaces, the features they would provide and the requirements on both the Concierge Provider, the concierge server and/or the CDRSs to provide these features are substantially the same as those described above with respect to interfaces (both direct operator access and concierge server interfaces) to ORSs, and any necessary modifications would be apparent to those with ordinary skill in the art.

Concierge Provider Interfaces Directly to Vendors

Links 720, 730 and 740 provide two way communications, e.g., in XML, directly between the concierge server and vendors which, in a preferred embodiment. Because there are likely to be vendors which would like to support real time transactions but for which there is no supporting ORS or CDRS, it may be preferable in some circumstances to provide for direct electronic communication between the Concierge Provider and one or more vendors. Although direct electronic communication links with three vendors is depicted in FIG. 9 as exemplary, it should be understood that the concierge server can support interfaces to any number of vendors. It will be appreciated by one of ordinary skill in the art having the benefit of the present disclosure that the nature of these interfaces, the features they would provide and the requirements on both the Concierge Provider, the concierge server and/or the vendors to provide these features are substantially the same as those described above with respect to interfaces (both direct operator access and concierge server interfaces) to ORSs, and any necessary modifications would be apparent to those with ordinary skill in the art.

It will be appreciated that the instant invention extends well beyond making reservations, reserving tickets and the like. The access to vendors and/or their intermediaries provided by the concierge server allows a host of other concierge services to be offered to subscribers. For example:

1) customers can keep in their personal profiles the types of specials they would like to be notified about (e.g. sales on Levi's jeans, Tropicana orange juice etc.), the concierge server can receive information regarding such sales over the above described interfaces (either directly from vendors or their intermediaries or by polling them) and the information passed on to the subscriber;
2) the subscriber can keep in his/her profile information about the types of television shows he/she likes to watch (e.g. favorite shows, favorite actors, favorite sports teams etc.). He/she can then simply call the concierge service and ask "what's on TV tonight," and, with the aid of a Concierge Provider interface to a TV Guide type system, be told about television shows he/she might like to watch;
3) the Concierge Provider can offer subscribers price comparisons of similar goods at different stores, notifying the subscriber when a desired event is taking place (e.g. Michael Jordan coming to Madison Square Garden to play the Knicks, the Bolshoi ballet in town, the Superbowl is on TV etc.);
4) the Concierge Provider can purchase items for the consumer, either on a single demand basis (e.g. a Sony 32 inch Sony WEGA television for under $400) or on regular intervals as defined by the subscriber (e.g. sending flowers to the subscriber's wife on their anniversary every year, the date of which is maintained in the subscriber's calendar).

Concierge-Type Service Example

By way of example, the concierge-type service will now be described with the aid of FIGS. 10 and 11. As mentioned before, the concierge-type service may be an information assistance service provided in step 1006 of FIG. 1. In this example, the caller is at John F. Kennedy airport in New York calling a friend (called party) in San Diego using the enhanced telecom service. While the caller and called party on a phone conversation, the caller suggests to have dinner with the called party at a vegetarian restaurant in "Cardiff by the Sea" near San Diego. Taking advantage of the enhanced telecom service feature which allows either the caller or called party to invoke information assistance during a call, the caller in this instance presses a predetermined telephone key to invoke information assistance. In a manner described before, an operator is conferenced in to the call to provide the necessary information assistance which includes in this instance a concierge-type service. It should be appreciated however, that a restaurant reservation service is but one type of service that the concierge-type service may be able to provide. Other areas of use may include, but are not limited to: information, reservation and ticketing for events, accommodation, transportation and travel, information regarding news, stock prices and weather, and providing access to other services such as grocery or flower delivery, etc.

Continuing the above example, the caller can either request directory listing information (step 210) or directly make a reservation request (step 208). If the caller requests restaurant listing information at step 210 the operator prompts the caller (step 211) for details regarding for example the type of restaurant, the restaurant location, the approximate date and time of the reservation and other preferences like for example dietary requirements, smoking or non-smoking, outdoors or indoors etc. The operator then inputs these details into a caller profile database through server 134 (step 212). Using a search engine, the operator searches a directory listing database through server 136 (step 213) for restaurants based on the above-mentioned caller details and preferences. As per our example, a suitable restaurant is located in "Cardiff by the Sea," near San Diego.

If the caller knew the name of the restaurant he/she wanted he/she may make a specific reservation request (step 208) directly on connection to the operator. In such a case or as per our example, the operator then prompts the caller for reservation details (step 214) such as the restaurant name (if the operator did not locate it, supra), the caller's name, a second choice of restaurant, a required reservation date and time, alternative times, contact details and any additional preferences such as smoking or non-smoking, type of credit card to be used, restaurant views, etc. These details are input into a browser type graphical user interface (GUI) as shown in FIG. 4. The reservation details are then stored in the caller profile database along with a reservation request or ticket while the caller is on hold (step 215). Based on the request, concierge server 28 at step 216 determines whether the request can be fulfilled in real time through an ORS described above. If positive, server 28 at step 217 attempts to fulfil the request on-line. At step 218 server 28 determines whether the real-time attempt(s) failed. If negative, at step 219 server 28 informs (e.g., textually) the operator of the reservation made thereby, who in turn informs (e.g., verbally) the caller on hold of the same, and then either provides the caller with further assistance or disconnects from the connection between the caller and called party (step 236).

Otherwise, if the request cannot be fulfilled in real time, the ticket is automatically forwarded to a fulfillment agent (FA) for processing off-line (step 220). The operator then informs the caller that the reservation request is being processed off-line, and either provides the caller with further assistance or disconnects from the connection between the caller and called party (step 236).

It should be noted that the operator may also process the ticket himself/herself. By default, the ticket is automatically forwarded to a fulfillment agent at the directory assistance center where the call was received, in our example New York. The operator, fulfillment agent or an automated system at the directory assistance center will then forward the request to the directory assistance center nearest the requested venue. In the illustrative example the request will be forwarded to the San Diego directory assistance center. The fulfillment agent in San Diego thus automatically receives the reservation request (step 221), shown by the graphical user interface in FIGS. 4-8.

The fulfillment agent then attempts to contact the restaurant (step 222). Should the fulfillment agent be able to contact the restaurant he/she will attempt to make a reservation (step 223). The fulfillment agent then updates the status of the ticket (step 224) on the system irrespective of whether he/she was, in fact, successful in making the reservation or not, indicating last action performed, result, reservation details etc. (as seen in FIGS. 6 through 8). After each change of status the fulfillment agent or the system automatically sets a next action time for his/her attention sometime in the future. The request then slots into the appropriate place in a fulfillment queue. The fulfillment agent cannot set nonsensical time periods like zero minutes or two years. New tickets are prioritized so as to be dealt with in a timely manner on a first-in-first-out basis. After a set amount of unsuccessful tries, the fulfillment agent is automatically prompted to try the second restaurant choice.

After a set amount of time, say for example thirty minutes, the fulfillment agent retrieves the status of the request (step 228) and contacts the caller informing him/her of the status of his/her request (step 230). The fulfillment agent may contact the caller by phone, fax, email or pager. The caller may also call the service back before the caller is contacted by the fulfillment agent (step 226). The reservation status is retrieved from the system (step 228) and the caller is informed of the current status of the reservation request (step 230). If required, the operator or fulfillment agent may modify the reservation request (step 232) which is automatically reforwarded to the fulfillment agent (step 218). Once the reservation is made or the caller indicates a desire to cancel the request, the operator or fulfillment agent closes the Ticket and provides the caller with further assistance or disconnects the caller from the system (step 236).

An important feature of the present invention is an activity logging function (step 234). All caller requests are logged in caller profile database server 134 in FIG. 2. The activity log helps with internal auditing and billing of that particular caller. On-demand printed reservation status reports may be provided to call center managers and/or supervisors. Furthermore when the caller makes use of the concierge service, his/her mobile identification number (MIN), caller details, most frequent requests and past request activity is automatically presented to the operator. The caller therefore will not have to resupply repetitive details to the operator, thus speeding up the process and reducing the operator's processing time. A fulfillment agent such as a supervisor who is not currently active, then handles any concierge requests that are active or open at that particular information assistance center.

The system may generate reports such as the number of calls processed by a particular center or by the system as a whole. Other reports may include reports indicating the average time spent on each ticket, the time spent fulfilling a ticket request and the time taken to contact a customer.

The telephonic concierge system may be affected by other scenarios such as: the fulfillment agent may be unsuccessful in contacting the restaurant; the requested reservation time may be unavailable; the caller might cancel the request; the caller may request a change in the reservation time while still pending.

Voicemail Direct Placement

As discussed above, there are a number of circumstances, in both the off-line and real time concierge fulfillment embodiments of the present invention, when it will be necessary or desirable for the Concierge Provider to provide the subscriber with information after the subscriber has placed his/her concierge request. For example, in the off-line embodiment, it is necessary to advise the subscriber of the results of the Concierge Provider's attempt to fulfill the subscriber's concierge request and information associated with the request (e.g. name and other information regarding the establishment at which the request was fulfilled, confirmation number, driving directions etc.) In the real time embodiment, for example, the Concierge Provider will confirm concierge requests which for whatever reason could not be confirmed in real time (or to advise the subscriber that the concierge request could not be fulfilled), as well as provide other information as described above (e.g. name and other information regarding the establishment at which the request was fulfilled, confirmation number, driving directions, etc.)

In addition to the various ways described above by which the Concierge Provider can contact the subscriber (mail, phone, fax, wireless device, pager, SMS device, e-mail/Internet etc.), there are circumstances when it is desirable to record a voice message for the subscriber. For example, because of the virtually universal proliferation of telephones, voice messages can be accessed from virtually any place, at any time, and do not require the subscriber to have or to be near any of his/her own communications devices in order to retrieve such messages. Moreover, there are some types of information that the subscriber may prefer to receive in the form of a recorded voice message.

Figure 12:
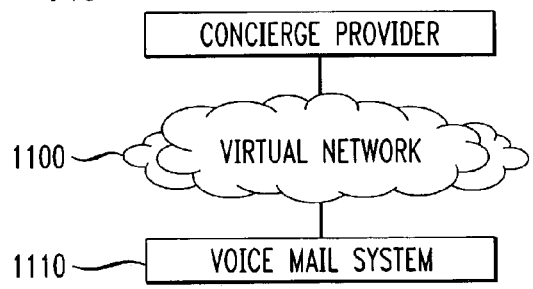
FIG. 12 illustrates an arrangement whereby information concerning fulfillment of a concierge request is provided to a caller.

In this illustrative embodiment, the enhanced telecom service provider establishes for each of its subscribers, as part of an initial service registration, a voice mailbox on a voice mail system maintained by the service provider. A recording of the voice message can be made at the Concierge Provider (by the fulfillment agent, an information assistance operator if said Concierge Provider is also an information assistance provider, or otherwise), and sent via virtual network 1100 in FIG. 12 (such as the Internet, a packet switched network, a virtual private network or a software defined network, etc.) to voice mail system 1110. An identifier would be sent along with the message, such as the subscriber's MIN or ANI, which will identify the subscriber and thereby the voice mailbox into which the message should be placed. The message may be transmitted to voice mail system 1110 in the form of a sound file such as a WAV file, MP3 file, etc.

It is understood that voice mail direct placement can be used instead of, or in addition to, any of the other methods of contacting subscribers (or others) described above. In one embodiment of this aspect of the present invention however, contact by voice mail direct placement is offered to all subscribers, whereas preferred subscribers are also (or alternatively) called by the Concierge Provider to assure receipt of the information, and to allow the caller to speak to a human at no additional charge who can answer any questions.

Additional Features

The system and method of the present invention has been described. Clearly, there are still other alternatives and equivalents that are within the spirit and intent of the invention and will occur to a person skilled in the art. For example, without limitation, the system may provide the caller with automated delivery of recorded and/or text-to-speech notification of status of the reservation, with schedule of attempts followed until confirmation of receipt is received. The caller may be able to make periodic requests, such as for example the same restaurant reservation on the first Monday of each month. The caller may request a group notification, to inform a group of people of the reservation confirmation details. The caller may make a "type" request where for example all restaurants of a particular type are contacted, from the nearest to the farthest until the request can be fulfilled. The caller may make a group negotiation by making a group reservation and getting consensus from all parties.

Data extracted from the system may be used for internal reports. Such reports may indicate system usage information or service (a particular restaurant hotel, airline) usage information. This information may include the most popular service requests, for example the most popular restaurants, and may be used to make recommendations. The data may also be utilized for other purposes such as marketing or market research.

Vendor Selection Criteria Conflict Resolution

In accordance with an aspect of the invention, when a subscriber makes a request for service without identifying specifically which vendor he/she would like to patronize, the present invention allows a vendor to be selected for the subscriber based on a broad set of diverse criteria. Examples of criteria which can be used by the Concierge Provider to select a vendor include:

1) The subscriber's preferred vendor(s) and other preferences of the subscriber, such as characteristics of vendors he/she likes to patronize, preferred service options, his preferred locations for request fulfillment, etc., as defined in the subscriber profile;

2) The Concierge Provider's preferred vendors. As described above, for example, a Concierge Provider may prefer vendors which will pay commissions to the Concierge Provider. It will be understood by those of skill in the art having the benefit of the instant disclosure that, in those embodiments of the instant invention in which a telephone carrier routes concierge request calls from its own subscribers to the Concierge Provider for fulfillment, the telephone carrier may itself have preferred vendors. (It should be noted that the term "telephone carrier" here is interchangeable with the "enhanced telecom service provider" especially when the function of the telephone carrier is absorbed into that of the enhanced "telecom service provider" as described before.) The telephone carrier's preferences can also be taken into account when selecting a vendor for one of its subscriber's requests;

3) Which vendor(s) can supply the goods or services desired by subscribers at the lowest cost;

4) Which vendors are closest to the subscriber's present geographic location (which can be determined using GPS technology, by interaction with the subscriber, or otherwise).

Furthermore, while some subscribers will want to fulfill their own concierge requests, and will simply want to be connected to the chosen vendor by the Concierge Provider (a scenario more likely to happen when the Concierge Provider comprises an information assistance provider), other subscribers will want the Concierge Provider to fulfill the requests for them. As discussed above, some vendors will support interfaces for electronic real time request fulfillment while others will not. Therefore, subscriber, Concierge Provider or telephone carrier preferred vendors can also be a function of the support provided by vendors for electronic request fulfillment.

Because such broad and diverse criteria are factored into the vendor selection process, there will be times when one or more selection criteria will conflict. For example, a subscriber may define in his/her profile that his/her preferred towing company is King's Towing, but the Concierge Provider may prefer Queen's Towing because that company pays the highest commissions. Or, the subscriber may request a dinner reservation at a restaurant near his/her present geographic location. After a GPS system (e.g., a GPS receiver incorporated in the subscribers' telephone) is utilized in a well known manner to determine the subscriber's present location, it may be determined that the telephone carrier's profile indicates that the subscriber does not have permission to have concierge requests fulfilled in that area. These are conflicts that the Concierge Provider must resolve before proceeding with attempts to fulfill the subscriber's concierge request.

In addition to conflicts between a subscriber's preferences and the preferences of one of his/her service providers, conflicts can also exist between preferences defined in a profile associated with a group to which the subscriber belongs and the subscriber's own personal profile. Indeed, even a subscriber's own vendor selection criteria may be inconsistent. For example, a subscriber's preferred restaurant may not accept his/her preferred credit card, or a subscriber's preferred car rental agency may not have cars available with the subscriber's preferred options.

Such conflicts can also arise in instances where the subscriber does identify specifically which vendor he/she wants to patronize. For example, the subscriber may specifically request a reservation at Tavern on the Green restaurant, but a profile for a group to which the subscriber belongs may indicate that the subscriber may not make reservations at a class of restaurants to which Tavern on the Green belongs (e.g., the group profile represents a company profile whereby the company would be billed directly for the cost of the meal, and Tavern on the Green belongs to a defined class of restaurants which are too expensive).

One method for resolving such conflicts, of course, is to simply notify the subscriber each time such a conflict arises and ask him/her for further instructions. While this method is within the scope of the instant invention, it is not preferred. If a subscriber has not identified a vendor at the time he/she places his/her concierge request, for example, he/she is presumably flexible as to the vendor, and might prefer that a vendor simply be selected for him/her, even if it is not his/her preferred vendor. Moreover, subscribers will likely not want to be bothered every time one of their preferences cannot be satisfied, irrespective of how important or unimportant the preference is to them.

Therefore, in accordance with a preferred embodiment of the instant invention, a conflict resolution algorithm ("CRA") is employed to resolve conflicts between vendor selection criteria. One example of the manner in which such CRAs are employed in the instant invention is described with respect to FIG. 13.

In step 400, a subscriber calls a Concierge Provider seeking fulfillment of a concierge request, and conveys information pertaining to the request to a Concierge Provider agent. In step 402, stored preferences profiles pertaining to the subscriber are identified. These would include, for example, the subscriber's personal profile, as well as any profiles associated with any groups the subscriber is a member of, any profiles defining preferences of the Concierge Provider, any profiles defining preferences of the subscriber's telephone carrier, etc.

In step 404, the agent listens to the subscriber's concierge request and enters it into the system, and in step 406, it is determined whether any conflicts exist between the subscriber's request and/or preferences and any conflicting instructions or other criteria the Concierge Provider might be operating under. While, in a preferred embodiment, the presence of such conflicts is identified automatically by the system after the agent enters the concierge request, it will be appreciated that the agent could be provided with information (either on his monitor or otherwise) which he could visually inspect for conflicts. Such visual inspection for conflicts is within the scope of the instant invention.

Figure 10:
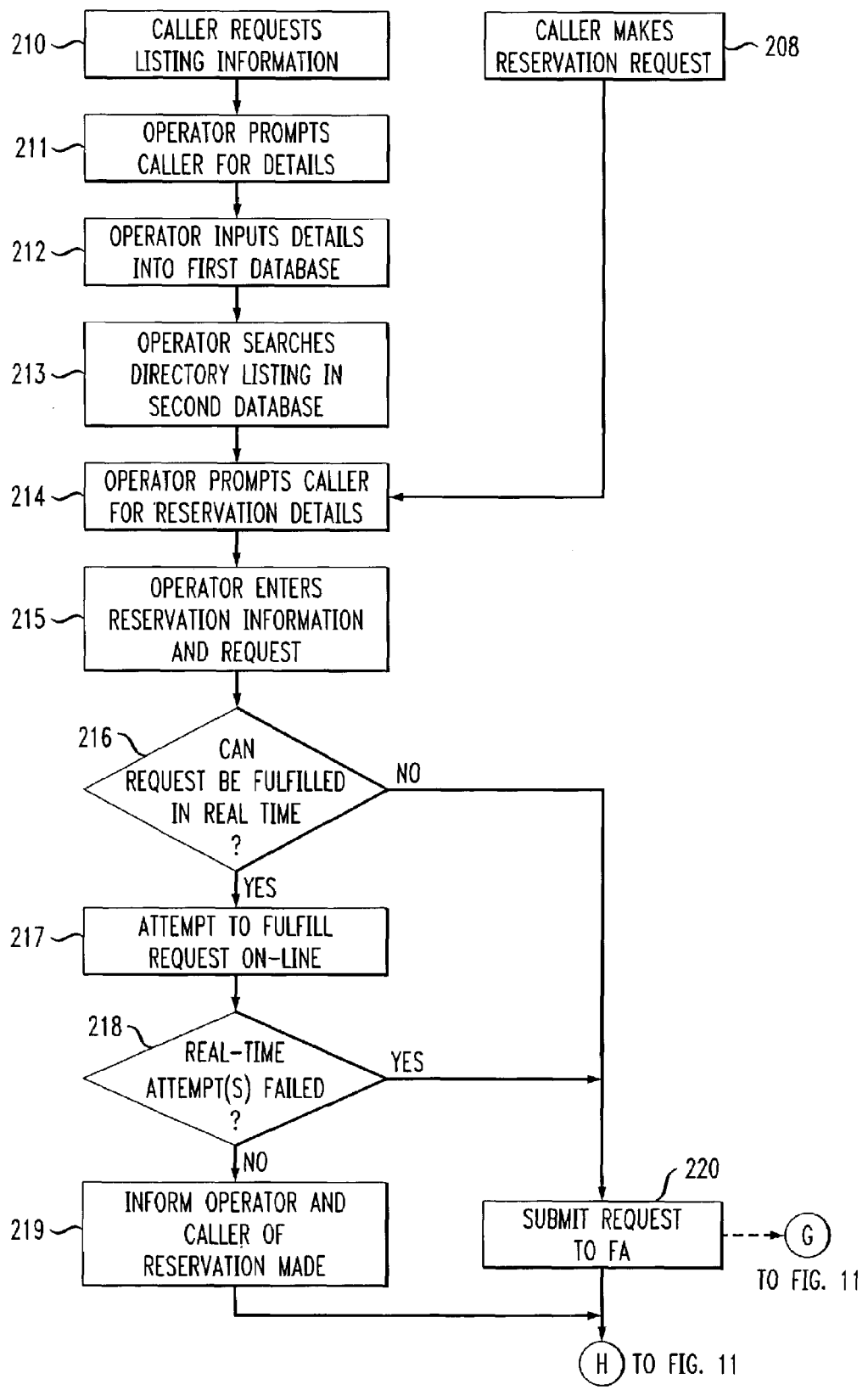
FIG. 10 is a flow chart depicting an embodiment of the method by which telephonic concierge assistance is provided to a caller.
Figure 11:
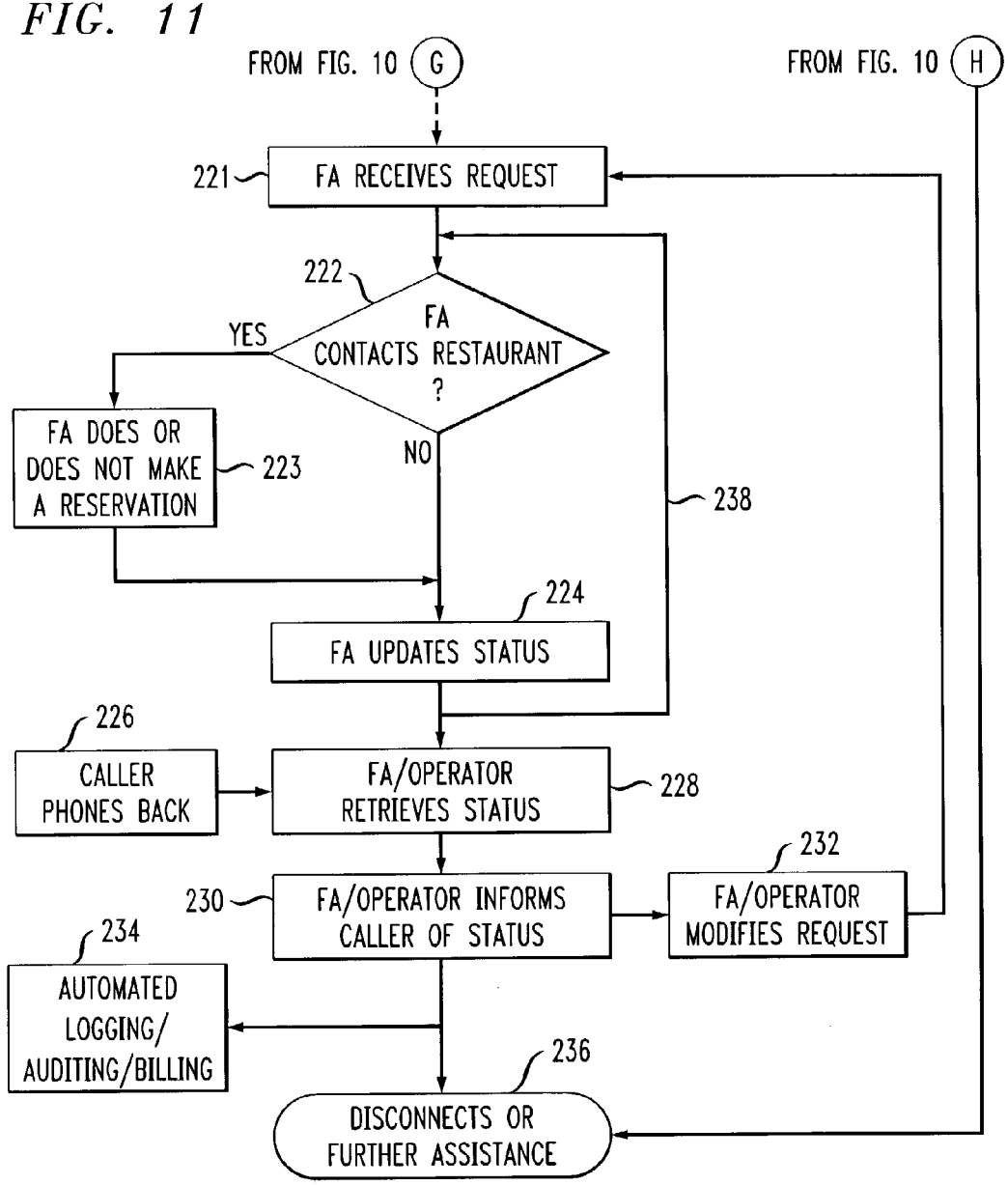
FIG. 11 is a flow chart further depicting an embodiment of the method by which telephonic concierge assistance is provided to a caller.

If it is determined in step 406 that no conflicts exist, the system proceeds to attempt to fulfill the concierge request in step 408, such as, for example, by proceeding to step 216 in FIG. 10.

If it is determined in step 406 that one or more conflicts does exist, the Concierge Provider proceeds to determine, in step 410, if the subscriber's concierge request included identification of a specific vendor, such as a specific restaurant, at which he/she would like his/her concierge request fulfilled, and whether it was that specifically identified vendor which caused the conflict. If the answer is yes, it is presumed that fulfillment of the request with the specifically identified vendor is critical to successful completion of the concierge request, and therefore the subscriber is notified of the conflict at step 412. It is likely the subscriber will then either change his concierge request or indicate that he does not desire fulfillment of an alternative request.

If the subscriber's concierge request did not include identification of a vendor at which he would like his concierge request fulfilled, a CRA is accessed in step 414 to attempt to resolve the conflict. In a preferred embodiment, the CRA is stored in association with the subscriber's personal profile, since the CRA for each subscriber can be different (e.g., the CEO of a company may have a CRA which indicates that his personal profile takes priority over the company's group profile, whereas this would not be true for the rank and file employees). Of course, the same CRA can also be used for a predefined group of subscribers, with that group CRA itself defining differences between how individual members of the group are to be treated. Those skilled in the art having the benefit of the instant disclosure will recognize that CRAs can be stored in any manner in which they can be readily retrieved, and that a CRA applicable to all subscribers can be utilized in addition to or instead of subscriber or group-specific CRAs.

Figure 14:
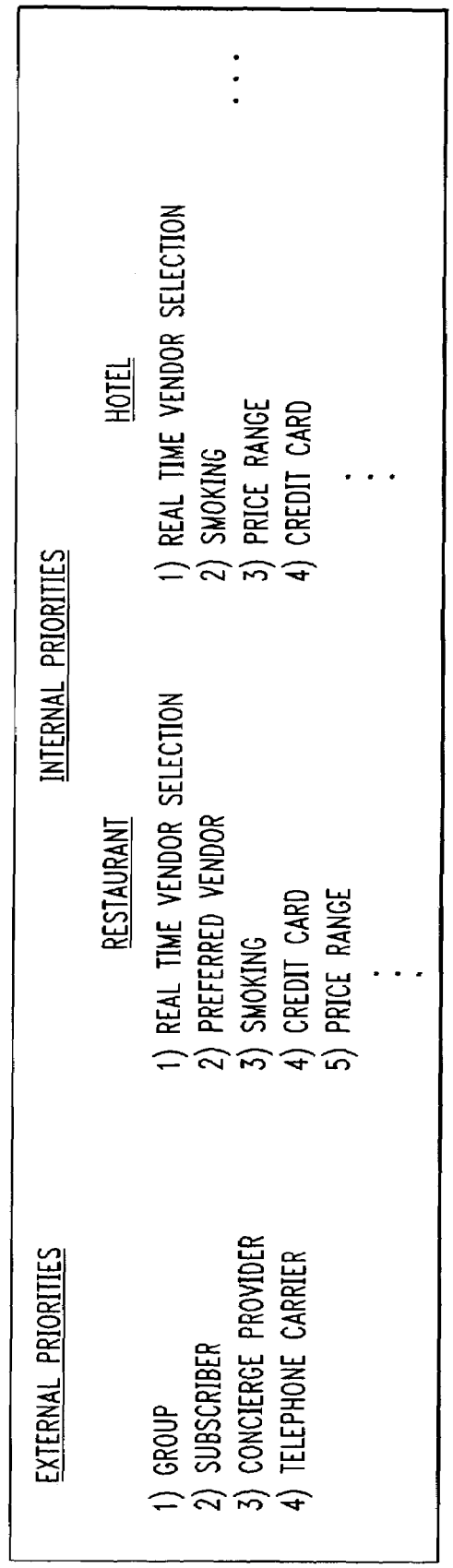
FIG. 14 illustrates an implementation of an algorithm for resolving the conflicts in accordance with an embodiment of the invention.

One example of a CRA is shown in FIG. 14. In this example, the CRA is implemented as a static definition of priorities, that is, which criterion takes precedence over which. As shown, the priorities are divided into "External Priorities" and "Internal Priorities." External priorities define priorities between the subscriber's criteria and the criteria of others (e.g. groups, service providers etc.), and internal priorities define priorities between conflicting criteria of the subscriber himself/herself.

In the example of FIG. 14, the "others" whose criteria is prioritized with those of the subscriber include one group of which the subscriber is a member, the Concierge Provider and the subscriber's telephone carrier. In this example, the criteria of the group take precedence over the subscriber's criteria. At the same time, the subscriber's criteria take precedence over those of the Concierge Provider and those of his/her telephone carrier. The telephone carrier's criteria in this example have the least priority, and will be ignored to the extent they generate any conflicts.

While, in this example, a given priority is applied to all of the criteria of an entity identified in the External Priorities, those skilled in the art will appreciate that priorities can be assigned to specific criteria of such entities (such as they are with internal priorities, as described below). For example, cost limitations imposed in a group profile may be defined to take precedence over all of the subscriber's preferences, but, so long as they are within these cost parameters, vendor preferences of the subscriber may be defined to take precedence over vendor preferences of the group.

The Internal Priorities shown in FIG. 14 define priorities on a criterion by criterion basis. For example, in FIG. 14, the subscriber's restaurant priorities are defined such that if a specific vendor is requested by the subscriber at the time he/she makes his/her concierge request, that criterion has priority over all other criteria he/she might have identified. Following such subscriber real time vendor selection, in descending order of priority for restaurant reservation requests, are defined vendor preferences (as defined in the subscriber's personal profile), smoking preferences, credit card preferences, price range preferences etc. As indicated in FIG. 14, additional restaurant criteria can be prioritized, as can criteria for any other type of request the subscriber might make.

FIG. 14 is intended as an example of a CRA only. Those skilled in the art having the benefit of the instant disclosure will appreciate that there are many ways of implementing CRAs, that there are many types of instructions and other criteria which can be prioritized, that conditional priorities can be implemented (e.g., "A" takes priority over "B" only if "C" is true), that inter-concierge request type criteria priorities can be defined for complex transactions and the like (e.g. preferred airline takes priority over preferred car rental service), etc., all of which are within the scope of the instant invention.

Figure 13:
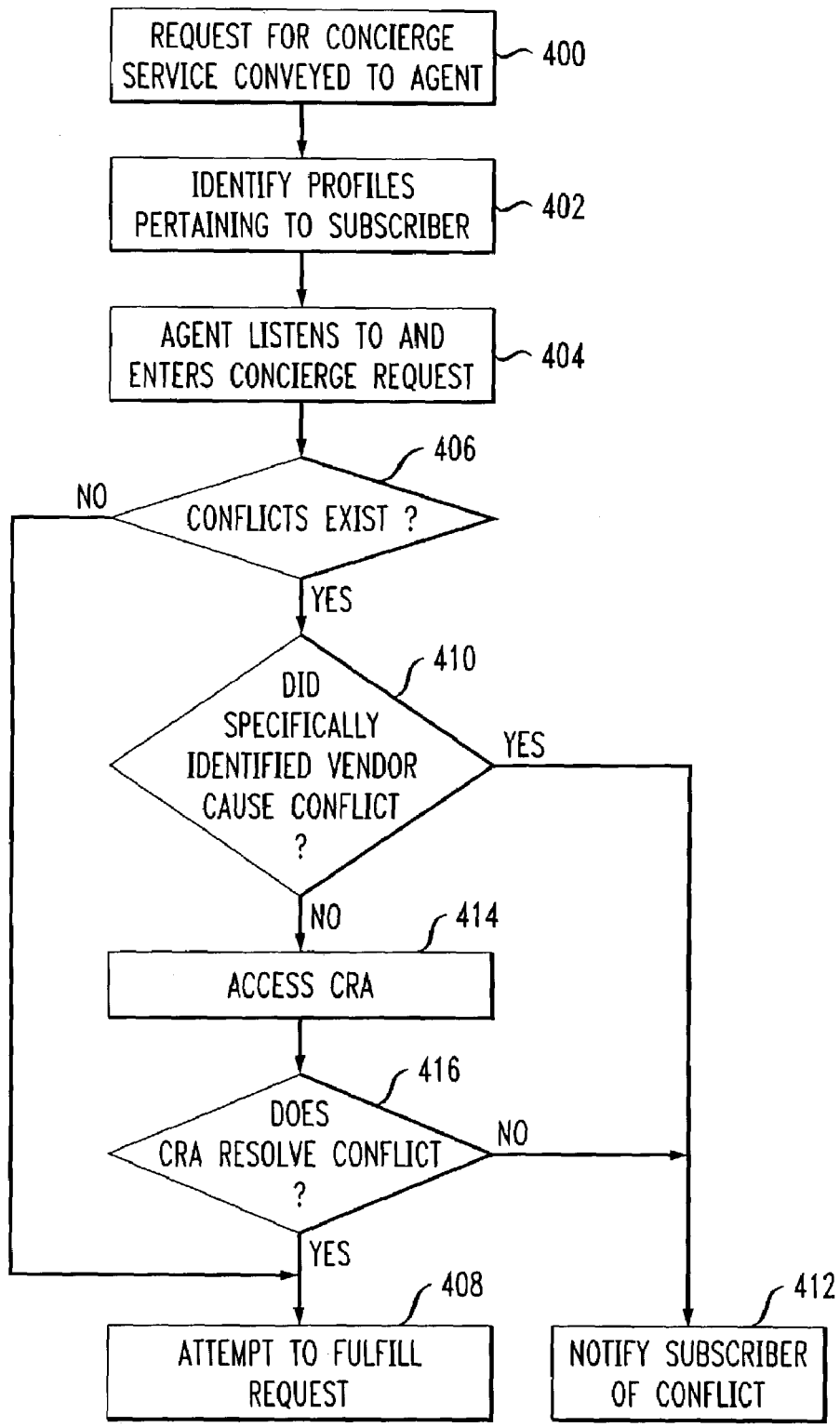
FIG. 13 is a flow chart depicting a process for resolving conflicts between vendor selection criteria in fulfilling a concierge request according to the invention.

In step 416 of FIG. 13, a determination is made whether the CRA accessed in step 414 resolved the conflict(s) identified in step 406. If so, the Concierge Provider attempts to fulfill the request in accordance with this resolution in step 408, such as, for example, by proceeding to step 216 in FIG. 10. Otherwise, the subscriber is notified of the conflict(s) in step 412.

In the example of FIG. 13, all conflicts are identified and resolved with respect to specific concierge requests after the subscriber has requested a concierge service. In some embodiments of the instant invention, a similar conflict identification and resolution scheme is employed at the time the subscriber sets up his/her personal profile. In this way, conflicts between the subscriber's stored criteria and the stored criteria of others can be resolved, to the extent possible, before the subscriber makes a request for service. While there are conflicts which cannot or will not be identified until such time as the concierge request is made, resolving those conflicts which can be identified based on stored criteria alone before a request is made will minimize future inconvenience to the subscriber.

The foregoing merely illustrates the principles of the invention. It will thus be appreciated that those skilled in the art will be able to devise numerous other arrangements which embody the principles of the invention and are thus within its spirit and scope.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing a concierge-type service at a service provider comprising:
   (a) receiving a call at the service provider from a caller;
   (b) directing the call to an agent;
   (c) receiving a request for a concierge-type service relating to an unidentified vendor from the caller;
   (d) automatically determining information related to said request, said pre-selected preference information comprising one or more vendors selected by the service provider;
   (e) determining if one or more inconsistencies exist between at least two of: user preferences received with said request, said preferred vendors of a group to which the caller belongs, said preferred vendors of a concierge provider, and said preferred vendors of a telephone carrier;
   (f) if no such inconsistencies exist, using said pre-selected preference information to identify an appropriate vendor;
   (g) otherwise, if said one or more inconsistencies exist, accessing stored information from which said inconsistencies can be resolved, and identifying said appropriate vendor; and
   (h) acting to fulfill said request.

2. The method of claim 1, wherein said pre-selected preference information relates to a location of the caller.

3. The method of claim 2, wherein said location of the caller is determined using GPS technology.

4. The method of claim 1, wherein step (d) further comprises retrieving said pre-selected preference information from computer storage.

5. The method of claim 4, wherein said vendors selected by a party other than the caller include one or more of: preferred vendors of a group to which the caller belongs, preferred vendors of a concierge provider, and preferred vendors of a telephone carrier.

6. The method of claim 1, wherein said service provider comprises an information assistance service provider, and said agent comprises an operator.

7. The method of claim 1, wherein step (f) further comprises connecting said caller to said appropriate vendor.

8. The method of claim 7, wherein step (f) further comprises attempting to fulfill said request with said appropriate vendor.

9. The method of claim 8, wherein a fulfillment of said request is attempted in real time.

10. The method of claim 9, wherein said request is fulfilled offline if said request cannot be fulfilled in real time.

11. The method of claim 5, wherein at least one of service provider preferred vendors and telephone carrier preferred vendors pays a commission.

12. The method of claim 5, wherein said pre-selected preference information further comprises a cost of fulfilling said request with a vendor.

13. A method for selecting a vendor with which to attempt to fulfill a service request, comprising:
   (a) receiving first vendor selection criteria from a user in conjunction with a user request;
   (b) accessing stored second vendor selection criteria;
   (c) determining if one or more inconsistencies exist between two or more vendor selection criteria;

(d) if no such inconsistencies exist, fulfilling said user request as a function of third vendor selection criteria; and (e) otherwise, if said one or more inconsistencies exist, obtaining information from which said inconsistencies can be resolved, and fulfilling said user request as a function of fourth vendor selection criteria and said information.

14. The method of claim 13, wherein said user request comprises a concierge request.

15. The method of claim 13, wherein said second vendor selection criteria comprise at least user preferences.

16. The method of claim 15, wherein said second vendor selection criteria further comprise preferences of a service provider.

17. The method of claim 16, wherein said preferences of a service provider comprise one or more of: preferences of a concierge provider, and preferences of a telephone service provider.

18. The method of claim 13, wherein said third vendor selection criteria comprise at least said first vendor selection criteria.

19. The method of claim 18, wherein said third vendor selection criteria further comprise said second vendor selection criteria.

20. The method of claim 13, wherein said fourth vendor selection criteria comprise said first vendor selection criteria.

21. The method of claim 13, wherein said fourth vendor selection criteria comprise said second vendor selection criteria.

22. The method of claim 13, wherein said information is derived from a profile associated with the user.

23. The method of claim 13, wherein said second vendor selection criteria comprise preferences of a service provider.

24. The method of claim 23, wherein said preferences of a service provider comprise one or more of: preferences of a concierge provider, and preferences of a telephone service provider.

25. The method of claim 23, wherein said third vendor selection criteria comprise said first vendor selection criteria.

26. The method of claim 25, wherein said fourth vendor selection criteria comprise said first vendor selection criteria.

27. The method of claim 25, wherein said fourth vendor selection criteria comprise said second vendor selection criteria.

28. The method of claim 14, wherein said concierge request is received by telephone.

29. The method of claim 13, wherein said information comprises prioritized vendor selection criteria.

30. The method of claim 29, wherein said prioritized vendor selection criteria comprise priorities of entities.

31. The method of claim 30, wherein said entities comprise two or more of: a subscriber, a group of subscribers, a concierge provider and a telephone carrier.

32. The method of claim 29, wherein said prioritized vendor selection criteria comprises conditional priorities.

33. A method for providing a concierge-type service at a service provider comprising:
(a) receiving a call at the service provider from a caller;
(b) directing the call to an agent in a first location;
(c) receiving a request from the caller for a concierge-type service relating to an unidentified vendor in a second location;
(d) transferring said request to another agent located in the second location;

(e) automatically determining information related to said request;
(f) using said information to identify an appropriate vendor; and
(g) acting to fulfill said request.

34. A method for providing a concierge-type service at a service provider comprising:
(a) receiving a call at the service provider from a caller;
(b) directing the call to an agent;
(c) receiving a request for a concierge-type service relating to an unidentified vendor from the caller, said request including first vendor selection criteria;
(d) accessing stored caller vendor selection criteria and stored service provider vendor selection criteria related to said request;
(e) determining if one or more inconsistencies exist between at least two of said first vendor selection criteria, said stored caller vendor selection criteria, and said stored service provider vendor selection criteria; and
(f) if one or more said inconsistencies exist:
accessing stored information from which said inconsistencies can be resolved;
and
fulfilling said request.

35. The method of claim 34, wherein said stored service provider vendor selection criteria includes at least one of preferences of a concierge provider, and preferences of a telephone service provider.

36. The method of claim 34, wherein if no said inconsistencies exist:
using said first vendor selection criteria and said stored service provider vendor selection criteria to identify an appropriate vendor; and
fulfilling said request.

37. The method of claim 34, wherein said stored information comprises prioritized vendor selection criteria.

38. The method of claim 1, wherein said pre-selected preference information further comprises one or more second vendors selected by a party other than the caller.

39. The method of claim 33, wherein said information comprises pre-selected preference information.

40. The method of claim 39, wherein said pre-selected preference information comprises one or more vendors selected by a party other than the caller.

41. A method for providing a concierge-type service at a service provider comprising:
(a) receiving a call at the service provider from a caller;
(b) directing the call to an agent;
(c) receiving a request for a concierge-type service relating to an unidentified vendor from the caller;
(d) automatically determining pre-selected preference information related to said request, said pre-selected preference information comprising first vendor criteria selected by the caller and second vendor criteria selected by a party other than the caller;
(e) determining if one or more inconsistencies exist between the first vendor criteria the second vendor criteria; and
(f) if one or more said inconsistencies exist:
accessing stored information from which said inconsistencies can be resolved;
and
fulfilling said request.

* * * * *